United States Patent
Schmidt

(10) Patent No.: US 10,254,925 B2
(45) Date of Patent: *Apr. 9, 2019

(54) GUI DOCUMENT MANAGEMENT SYSTEM

(71) Applicant: Donald Richard Schmidt, Stockton, CA (US)

(72) Inventor: Donald Richard Schmidt, Stockton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/427,922

(22) Filed: Feb. 8, 2017

(65) Prior Publication Data
US 2017/0147173 A1    May 25, 2017

Related U.S. Application Data

(63) Continuation of application No. 13/715,860, filed on Dec. 14, 2012, now Pat. No. 9,588,653.

(60) Provisional application No. 61/578,823, filed on Dec. 21, 2011.

(51) Int. Cl.
| | |
|---|---|
| *G06F 3/0481* | (2013.01) |
| *G06F 3/0482* | (2013.01) |
| *G06F 3/0484* | (2013.01) |
| *G06F 17/24* | (2006.01) |
| *G06F 17/22* | (2006.01) |
| *G06F 8/38* | (2018.01) |

(52) U.S. Cl.
CPC .......... *G06F 3/0482* (2013.01); *G06F 3/0484* (2013.01); *G06F 17/2235* (2013.01); *G06F 17/2247* (2013.01); *G06F 17/24* (2013.01); *G06F 8/38* (2013.01)

(58) Field of Classification Search
None
See application file for complete search history.

(56) References Cited

U.S. PATENT DOCUMENTS

| | | | | |
|---|---|---|---|---|
| 5,781,189 | A  * | 7/1998 | Holleran | G06F 9/52 715/826 |
| 6,278,448 | B1 * | 8/2001 | Brown | G06F 3/0481 715/866 |
| 6,493,733 | B1 * | 12/2002 | Pollack | G06F 17/3089 707/E17.116 |
| 6,608,634 | B1 * | 8/2003 | Sherrard | G06F 17/30899 707/E17.119 |
| 7,210,095 | B1 * | 4/2007 | Mor | G06F 17/30893 707/E17.117 |
| 7,234,107 | B1 * | 6/2007 | Aoki | G06F 17/2247 707/E17.121 |
| 7,536,641 | B2 * | 5/2009 | Rosenstein | G06F 17/24 709/205 |

(Continued)

*Primary Examiner* — Phenuel S Salomon
(74) *Attorney, Agent, or Firm* — Bekiares Eliezer LLP

(57) ABSTRACT

Embodiments of the present disclosure provide a GUI web-browser with functionality to create, edit, and retrieve GUI documents as GUI web pages. The GUI web-browser may be enabled to display a GUI document in a GUI document display format as a GUI web page. A user may be enabled to modify the GUI web page in a similar way as they would modify a GUI based document. The modified GUI document may be then saved as a GUI web page comprising edited GUI elements. A specification to the GUI document comprising the GUI elements may be saved in a storage format, and then loaded in a display format for display as the GUI web page.

16 Claims, 20 Drawing Sheets

(56) References Cited

U.S. PATENT DOCUMENTS

| | | | | |
|---|---|---|---|---|
| 2004/0044966 | A1* | 3/2004 | Malone | G06F 17/214 715/255 |
| 2004/0133635 | A1* | 7/2004 | Spriestersbach | G06F 17/30905 709/203 |
| 2005/0039113 | A1* | 2/2005 | Balducci | G06F 17/2247 715/239 |
| 2006/0224697 | A1* | 10/2006 | Norris | G06F 9/451 709/218 |
| 2007/0055755 | A1* | 3/2007 | Sasnett | G06F 17/24 709/223 |
| 2007/0283251 | A1* | 12/2007 | Pally | G06F 17/24 715/234 |
| 2008/0040473 | A1* | 2/2008 | Larsson | G06F 17/30896 709/224 |
| 2008/0184100 | A1* | 7/2008 | Selig | G06F 17/243 715/225 |
| 2008/0294750 | A1* | 11/2008 | Kosonen | H04L 67/306 709/219 |
| 2009/0055755 | A1* | 2/2009 | Hicks | G06F 17/3089 715/760 |
| 2013/0246294 | A1* | 9/2013 | Pendyala | G06Q 10/1053 705/321 |

* cited by examiner

FIG. 11A

1100 - Simple ASCII text file format #1:

General Format for Each Line of Text:    Element_ID:PropertyOneNme=Value,PropertyTwoName=Value,........,
                                                                         PropertyNName=Value
    Example Presentation:

Line #1 - PageWindow: Backcolor=Blue,Title="Page One - Introduction",,

Line #2 - Label: Backcolor=White, Forecolor=Black, Text="Preface", Font="MS Sans Serif, FSize= 16,
                FStyle=Italic, Top=100, Left=700, Height=100, width=200, ......

Line #3 - TextBox: Backcoloe=Black, Height=400, Width=800, Text="Appreciation for helping with......",
                Top=400, Left=300, ........

1110 - Simple ASCII text file format #2:

General Format for Each Line of Text: Element_ID: Property_1_ Value ,Property_2_Value,........,Proper_N_Value Page Window Property Order: Backcolor, Title, BackgroundImage, .....

Label Property Order: Backcolor, Forecolor, Text, Font, FSize, FStyle, Top, Left, Height, Width, ......

TextBox Property Order: Backcolor, Textcolor, Text, Font, FSize, FStyle, Top, Left, Height, Width, ......

Example Presentation:

Line #1 - PageWindow: Blue, "Page One - Introduction",,

Line #2 - Label: White, Black, "Preface", "MS Sans Serif", 16, Italic, 100, 700, 100, 200

Line #3 - TextBox: Black, Yellow, "Appreciation for helping with....",,, 400, 300, 400, 800

1120 - Sample ASCII text file format #3:

FIG. 11B

1120 - Sample ASCII text file format #3:

General Format: XML Document as specified by World Wide Web Consortium:

Example Presentation:

```

<element category="Page Window">
    <title>Page One - Introduction</title>
    <backcolor>Blue</backcolor>
    <image></Image>
  </element>
  <element category="Label">
    <text>Preface</text>
    <Font>MS Sans Serif</Font>
    <FSize>16</FSize>
    <FStyle>Italic</FStyle>
    <Backcolor>White</Backcolor>
    <Forecolor>Black</Forecolor>
    <Top>100</Top>
    <Left>700</Left>
    <Height>100</Height>
    <Width>200</Width>
  </element>
  <element category="TextBox">
    <text>My appreciation for helping with....</text>
    <Backcolor>Black</Backcolor>
    <Textcolor>Yellow</Textcolor>
    .
    .
    .
  </element>

1130 - Sample Database Format:

1132    Table #1: Name = Pages
         Fields:  Page_ID, Backcolor, Title, BackImg, .....

1134    Table #2: Name = Objects
         Fields:  Page_ID, Type, Top, Left, Height, Width, Forecolor, Backcolor, File, Text .....

1136    Example:

Pages:

| Page_ID | Backcolor | Title | BackImg | ....... |
|---|---|---|---|---|
| Main | Blue | Welcome to Our Site | | |
| About | Green | What, When, Why, Who, Hpw | | |
| Contact | | Our Contact Page | \images\main.jpg | |

Objects:

| Page_ID | Type | Top | Left | Height | Width | Forecolor | Backcolor | File | Text ....... |
|---|---|---|---|---|---|---|---|---|---|
| Main | Label | 10 | 650 | 30 | 200 | white | blue | | Hello World! |
| Main | TextBox | 50 | 200 | 400 | 600 | Yellow | blue | | Welcome to the world of fun and exci... |
| About | Label | 10 | 650 | 30 | 200 | white | blue | | Welcome to Our About Page |
| About | TextBox | 50 | 200 | 400 | 600 | white | blue | | Here you will learn about us and the .... |
| About | Image | 10 | 10 | 240 | 380 | | | \images\img.jpg | |
| Contact | Image | 10 | 10 | 240 | 380 | | | \images\contct.jpg | |
| Contact | Label | 10 | 400 | 75 | 400 | red | pink | | You can contact us in the follow...... |
| Contact | ListBox | 50 | 400 | 400 | 400 | red | pink | | Email:  us@oursite.org;Fax:  (209) |

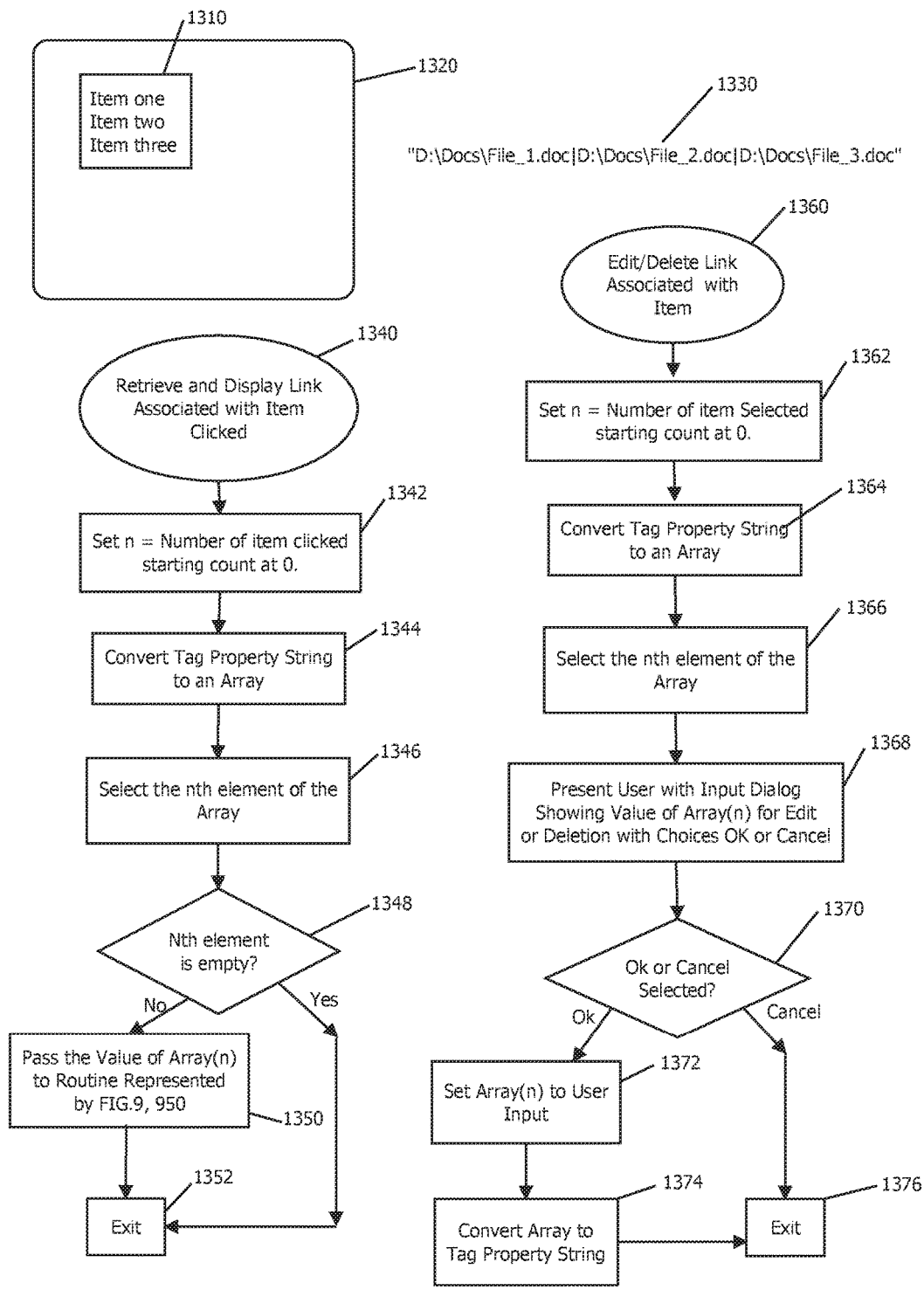

FIG. 15

| Stored Format Location Specifications for GUI Documents | | |
|---|---|---|
| LFS | Generic: Drive:\Dir_1\Dir_2\.....Dir_n\Filename | |
| | Example: D:\My Documents\GUI Document.txt | |
| UNC/ LAN | Generic: \\ComputerName\RootDir\Dir_1\Dir_2\...Dir_n\Filename | |
| | Example: \\FileServer\GUIDocsSite\John Docs\MainPage.xml | |
| URI/ WAN | Generic: http://DomainName/Directory/File | |
| | Example: http://www.GUIDocuments.org\John Docs\MainPage.xml | |
| DB | Generic: DBMS://Server/DatabaseName/PageIdentifier | |
| | Example: DBMS://www.GUiDocuments.org/JohnDocs/MainPage | |

1510 — LFS
1520 — UNC/LAN
1530 — URI/WAN
1540 — DB

GUI DOCUMENT MANAGEMENT SYSTEM

RELATED APPLICATIONS

Under provisions of 35 U.S.C. § 119(a), the Applicant claims the benefit of U.S. application Ser. No. 13/715,860, filed Dec. 14, 2012, which is incorporated herein by reference. U.S. application Ser. No. 13/715,860, in turn, is a non-provisional application claiming priority to U.S. Provisional application No. 61/578,823, filed Dec. 21, 2011, the disclosure of which is incorporated herein by reference. The present specification includes subject matter, which is filed in the present application as a continuation to U.S. application Ser. No. 13/715,860, filed Dec. 14, 2012, which is incorporated herein by reference. To the extent the claimed subject matter of the present disclosure incorporates subject matter not enabled by the parent application(s), the present application should be considered as a continuation-in-part to U.S. application Ser. No. 13/715,860, filed Dec. 14, 2012, which is incorporated herein by reference. It is intended that the referenced applications may be applicable to the concepts and embodiments disclosed herein, even if such concepts and embodiments are disclosed in the referenced applications with different limitations and configurations and described using different examples and terminology.

FIELD OF DISCLOSURE

The present disclosure relates to a graphical user interface enabling users to interface with a computing operating system. In particular, the present disclosure relates to multimedia presentation document creation and editing software, including, for example, but not limited to, power point presentations, acrobat pdf files, desktop publishing software, and HTML documents which are the basis of the World Wide Web.

BACKGROUND

The inspiration behind the present disclosure originates from a problem inherent to Hypertext Markup Language (HTML) documents which form the basis of the multimedia web pages out of which the World Wide Web is made. The Web is an immense collection of multimedia documents, called pages, distributed throughout the filing systems of server computers in which each page can have multiple hyperlinks to other pages on other servers and in which servers are accessible to a user of a computer, called a client, connected to the internet. The HTML markup language defines the display elements and attributes to be applied by a computer in rendering or drawing the page an essential element of which is the href element also known as a hyperlink.

The specific problem with HTML is that a rendered HTML page displayed on a computer monitor is not amenable to direct editing by a user via a user interface for directly modifying (adding, deleting, editing) any HTML element in the display including any attribute of an HTML element. The developer of HTML, Tim Berners-Lee, envisioned early on that a single software program for browsing (viewing) and for creating and editing web pages directly from its display is desired. It has been dubbed the read-write web. The W3C (World Wide Web Consortium) maintains an open source project called Amaya which targets this goal, but to this day the separation between web browsers and web editors has not only dominated the industry but has increased. There are of course wikis, blogs and social networks like Facebook where a user is provided an interface to input data that results in modifications of displayed HTML, but the fact remains, there is no web browser that permits the loading and presentation of any HTML and enables users to modify (add, delete, edit) any HTML element and any attribute of any HTML element in a display and save them back to the server. The reason the problem exists is that HTML elements as defined and displayed on computer monitors are not equipped with events that users can trigger via input devices such as mouse or keyboard which then present the user with means of creating new html elements or editing attributes of existing ones. The result is that learning HTML web page creation and editing is difficult in terms of the effort and time one must invest to become modestly proficient at it. The separation of software for creating and editing web pages from the software for displaying and interacting with them results in slowing the process of web page creation and editing because developers must frequently test each web page during development by loading it into a browser to determine if it meets design specifications and works correctly.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

GUI, pronounced "gooey," is an acronym for Graphical User Interface. Most computer or computing device operating systems today implement a GUI. The term "GUI element" as used herein refers to classes as defined in object oriented programming, and classes are objects which have properties, methods, and events. GUI elements are commonly referred to as controls or widgets and include windows, forms, text boxes, labels, data grids, image boxes, combo and list boxes, timers, command buttons, check boxes, radio buttons, date and time pickers, and many, many more. GUI elements are included in the operating systems of computers which provide a graphical user interface and said elements are intended to be used by software developers to build applications or programs in which GUI elements form interactive displays of data generally allowing users to perform productive tasks in connection with computer programs. These elements therefore provide developers with a great deal of flexibility to program events which users can invoke to accomplish tasks. Additionally, developers have the ability to add additional properties, events, and methods to existing elements and can also combine existing elements to make new compound elements. And developers can design from scratch new GUI elements for incorporation into an operating system which can then be used by other developers in their software. An important feature of some GUI elements is that they are designed to be containers for other GUI elements, and can even contain additional instances of themselves thus forming hierarchies of elements within elements, within elements, ad infinitum.

One of the key concepts of the present disclosure is that, although GUI elements were developed to provide a graphical user interface for application programmers to incorporate into software to accomplish tasks, clearly they can also be used to display, yield, impart, or give information as in a book, magazine, power point presentation, or HTML web page. Additionally, through programming of events or associating scripts to be executed when an event occurs, one can develop highly interactive multimedia documents, like HTML web pages. And hyperlinks, the hallmark of the World Wide Web, can also be easily emulated using GUI element event programming. Additionally, since GUI elements are designed for event programming, any displayed GUI element can be programmed to fully permit users to trigger events that permit creating new elements and changing the properties of existing elements, thus overcoming the limitations imposed by HTML elements.

In view of the forgoing, embodiments of the present disclosure may provide users with GUI elements of a graphical user interface, and a wysiwyg (what-you-see-is-what-you-get) user interface with which they can create and edit multimedia presentation documents which shall be called GUI documents (or pages) made out of said GUI elements, one or more of which may contain links, the equivalent of the HTML href element or hyperlink, a means to save to a file storage media all data needed to recreate a displayed page as designed, and a means for retrieving and converting said data back into the display page. The various embodiments disclosed herein provide the basis for a single application program for use to create and fully edit as well as to browse GUI documents forming document webs thus constituting a fully read-write web. This present disclosure thus provides, among other things, an alternative to the World Wide Web with the immediate advantage that it is fully read-write.

GUI elements provide a nearly infinite variety of ways in which they can be used in different embodiments of this disclosure. This disclosure provides the gear that can take many forms and be used to build an infinite variety of machines. It is therefore understood that an embodiment of the present disclosure may provide a user interface which may be included in a variety of application programs related to multimedia presentations and not confined to merely creating document webs like the World Wide Web.

In addition to providing a truly read-write web, the system developed here offers additional advantages. For example, creating multimedia documents using the system developed here is easier and less time consuming to learn than HTML web page and web site development. Additionally, the system can be readily combined, coordinated, and augmented with software components, modules, routines, and data structures to achieve a wide variety of useful multimedia authoring applications. For example, the system can be readily adapted to create a collaborative document development system involving multiple authors working on multiple documents accessed over a network or the internet, and can be the basis for developing educational and learning management systems, and for developing linked distributed document webs comparable to the World Wide Web.

Embodiments of the present disclosure may further make it easier and less time consuming to incorporate editable data from databases into documents. Incorporating a common GUI element called a datagrid into an embodiment greatly simplifies the process of designing pages containing tables of data from databases which can be readily and directly edited by users if they have permission. The designer of a page simply may position and size a data grid, then invoke an event that gives a simple dialog form to fill out the database location, the structured query language select statement to obtain the data and the task is complete. There is no need for complex programming of server side software to obtain the data from the database and incorporate it into the HTML document sent to the client. With this disclosure, the datagrid, not the page designer, performs these functions automatically on the client after the page document is delivered. Additionally, there is no complex programming and traffic involving back and forth data transmissions between client and server to enable a user on the client to modify a value in a cell of the table. The datagrid on the client takes care of these tasks automatically and directly communicates with the database.

It is also possible to develop embodiments of this disclosure that offer execution of client side scripts to achieve effects comparable to Dynamic HTML on the WWW. Microsoft Corporation has implemented a GUI element called a scripting control which can be emulated on other computing systems and incorporated into embodiments of this disclosure. The scripting control provides a user interface dialog to select another GUI element on the same page and an interface to type or copy and paste scripting language routines to access and modify the properties of the selected element, and invoke its events and methods thus providing the capability to develop dynamic documents comparable to Dynamic HTML.

Additionally, embodiments of this disclosure may allow seamless integration between WWW (HTML) documents and GUI documents made with this disclosure. Microsoft Corporation includes with its operating systems a web browser control, a GUI element that can also be incorporated in an embodiment of this disclosure along with a user interface to allow users to input a URI (web page address or location) to be displayed whenever the control is displayed. Once a web page is displayed, the user can click any of its hyperlinks to surf the links and return to the originally displayed page at any time. An HTML web page can thus be included as an element of a page of this disclosure. From this point of view, the documents made using this system, which may be called GUI documents or pages, can be regarded as a superset of documents which can contain WWW (HTML) documents or pages.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings:

FIGS. 11A, 11B and 11C identify several stored formats that can be used to save all data needed to recreate a given page.

FIG. 13 shows flowcharts of methods for implementing links to entries in a list box.

FIG. 15 shows stored format location specifications for GUI documents in different stored formats.

DETAILED DESCRIPTION

Figure 1:
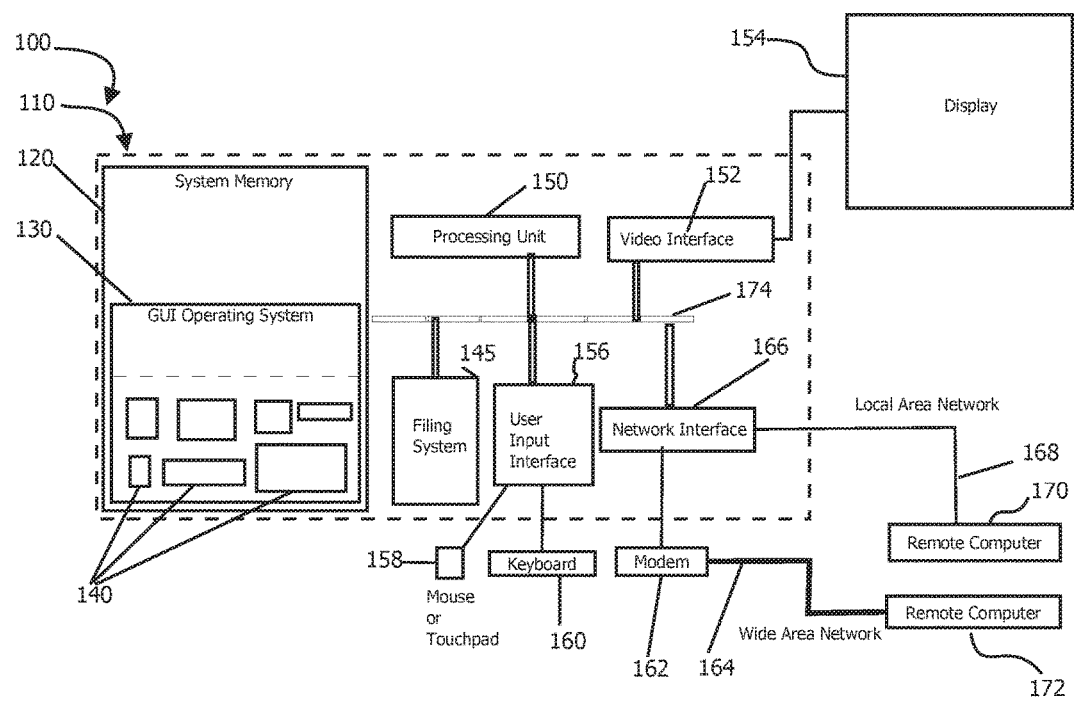
FIG. 1 is a block diagram of a computer hardware system for implementing embodiments of the present system.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present system will now be described with reference to FIGS. 1 through 14D, which in embodiments relate to a GUI allowing users to interface with a computer operating system. The present system may operate over a wide variety of operating systems using graphical user interfaces, including for example the Macintosh operating system by Apple Computer, Inc., and Windows operating system from Microsoft Corporation, and the Linux operating system.

The GUI described herein can be implemented on a variety of processing systems. FIG. 1 illustrates an example of a suitable general computing system environment 100 on which the present system may be implemented. The computing system environment 100 is only one example of a suitable computing environment and is not intended to suggest any limitation as to the scope of use or functionality of the system. Neither should the computing system environment 100 be interpreted as having any dependency or requirement relating to any one or combination of components illustrated in the exemplary computing system environment 100.

The present system is operational with numerous other general purpose or special purpose computing systems, environments or configurations. Examples of well known computing systems, environments and/or configurations that may be suitable for use with the present system include, but are not limited to, personal computers, server computers, multiprocessor systems, microprocessor-based systems, set top boxes, programmable consumer electronics, network PCs, minicomputers, mainframe computers, laptop and palm computers, hand held devices including personal digital assistants and mobile telephones, distributed computing environments that include any of the above systems or devices, and the like.

The present system may be described in the general context of computer-executable instructions, such as program modules, being executed by a computer. Generally, program modules include routines, programs, objects, components, data structures, etc., that perform particular tasks or implement particular abstract data types. The present system may also be practiced in distributed computing environments where tasks are performed by remote processing devices that are linked through a communications network. In a distributed computing environment, program modules may be located in both local and remote computer storage media including memory storage devices.

FIG. 1 depicts an exemplary system for implementing the present system and includes a general purpose computing device in the form of a computer 110. Components of computer 110 may include, but are not limited to, a system memory 120 with a graphical user interface (GUI) operating system 130 containing a number of GUI elements 140. A processing unit 150 for executing instruction code contained in system memory 120 accessed via a system bus 174 which connects the processing unit to other components including the video interface 152, the filing system 145, the user input interface 156 and the network interface 166. The video interface 152 connects to the display or monitor 154 providing a visual interface to users. The user input interface 156 connects user input devices such as a mouse 158 and keyboard 160 to the system bus 174. A network interface 166, if equipped, provides connection between the system bus 174 and external computer 170 on a local area network 168. A modem 162, if equipped, connects remote computer 172 over wide area networks 164 such as the internet or an intranet.

An application program containing an embodiment of this disclosure stored in the filing system 145 can be launched or run by being read into the system memory 120 and its starting memory address passed to the processing unit 150 for execution. Examples of operating systems on which embodiments of this disclosure may run include but are not limited to McIntosh, Unix, Linux, and Microsoft Windows.

A GUI document management system is based on a GUI document, defined as a computer document having two formats, a display format comprising a visible GUI container element (a window or form, for example) for containing and displaying GUI elements (such as text boxes, image boxes, labels, datagrids, etc.), and a suitable stored format for persisting to a file in a filing system's storage media the data needed to recreate the display format. The system further provides a graphical user interface allowing users to create new, edit existing, save new or existing, and delete or retrieve for display existing GUI documents. Additionally, GUI documents contain links that are essentially equivalent to the hyperlinks of HTML documents.

Hereafter, the term "GUI document" and "page" are used interchangeably. A display page or displayed page refers to a GUI document in display format as it appears on a computing device monitor, screen, or display. In display format, a GUI document or page is of course volatile—it ceases to exist when the power is turned off. A stored page refers to all the data needed to recreate a GUI document in display format as saved to a file in a filing system storage media. The term stored page is also used to refer to the raw data when it is read into a computing device's volatile memory from a storage media and before any manipulation or calculation or other processing is performed on it. The stored format or storage format of a GUI document or page refers to how the data in the stored page is structured, formatted, or arranged so that a GUI document management system can reliably use the data to recreate the display format. And lastly, the terms "location" and "address" are used interchangeably after the terms "GUI document" and "page" to refer to the way, method, or manner a stored format in a file in a computer filing system must be identified so that it can be opened for read-write operations. A page address will always require identifying the path to a file in a directory tree of an accessible computing device filing system containing the stored page and if that file contains more than one stored page, the page address will additionally require a page identifier for distinguishing the data belonging to a page from all others. Said accessible computing device filing systems, or simply accessible filing systems, could be the local computer's filing system, the filing system of a Local Area Network to which the local computer is connected, or a server on the internet or an intranet accessible to the local computer, the local computer or computing device being the one on which is installed software implementing a GUI document management system.

The present system will now be described in reference to the drawings of FIG. 2 through 15.

Figure 2:
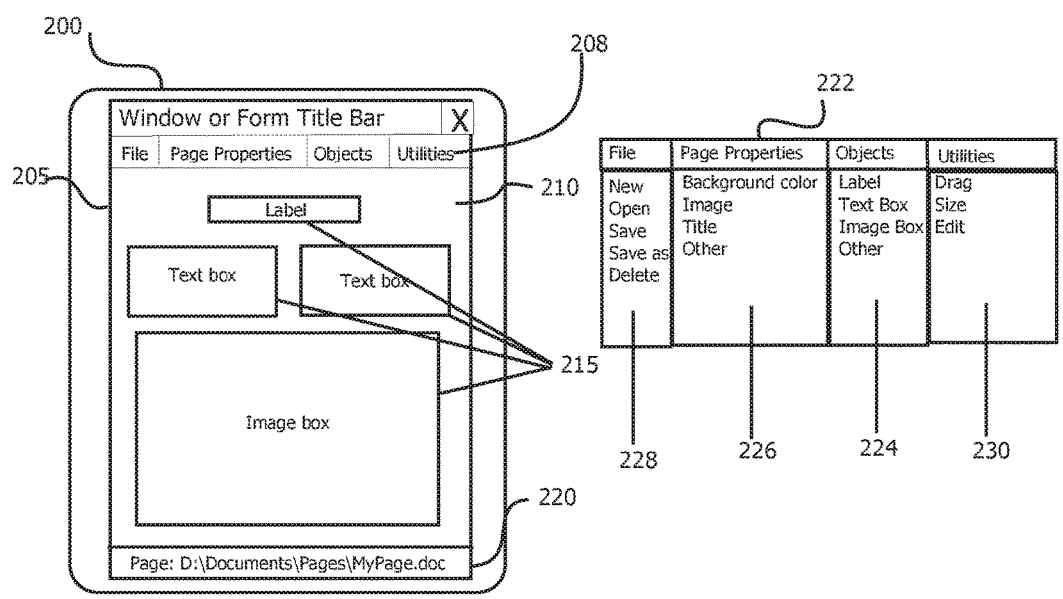
FIG. 2 is a block diagram of visual user interface components for implementing embodiments of the present system.

FIG. 2 shows, for illustration only, a complete embodiment of all the essential components of a GUI document management system. Purposely left out for clarity and brevity are various necessary components of a computer system needed for the embodiment to work, such as input devices, such as a keyboard and mouse, filing system components, microprocessors, etc. The system comprises a set of visual GUI elements that can be used for an embodiment of this disclosure, but it is understood that any other GUI elements providing comparable functionality could also be used. The system depicted in FIG. 2 shows a computer or computing device monitor or display 200 where video output is displayed. The user is presented with a GUI element normally called a window or form 205 with its properties set to arbitrary default values. A form or window is a GUI element that can contain other GUI elements. This window will be referred to hereafter as the page window. The client area of this window or form 210 serves as the container where one or more instances of a set of GUI elements can be placed, sized, and assigned values for their properties. The set of GUI elements designated for use in an embodiment of this disclosure by a developer are hereafter referred to as presentation elements. It is understood that one or more of the elements that can be used in an embodiment may contain instances of themselves or other elements, including elements which may contain still other elements, thus forming hierarchies of elements within elements, though the illustrations here do not show such embodiments.

For purposes of illustration only, a variable 220 of string data type or equivalent is used to store in memory the page address (explained in FIG. 15) corresponding to the currently displayed page 205 containing presentation elements 215. The variable 220 would be set to the empty string, " ", if the displayed page does not correspond to a stored page, or is set to the page address corresponding to it. In some embodiments this variable could be the string property of a text box, for example, which the user can see and in which the user may type or select a page address representing a page he wishes to retrieve and display.

For purposes of illustration only, the page window provides a user interface known as a menu 208. The menu in this illustration provides sub menus of items representing the methods for performing functions needed in an embodiment of this disclosure. Menus are classes provided in any GUI operating system. Each item in a menu has user invokable events associated with it (for example, click events or key combinations simultaneously pressed) which can be programmed by developers of an embodiment of this disclosure. The menu 208 is shown in 222 as it would appear if all submenus were fully expanded. The expanded menu 222 shows most of the functions that need to be performed by this disclosure. The "Objects" menu 224 shows each presentation element permitted in this embodiment (for illustration only) for a user to place as many of each in the page window as desired. A method for accomplishing this task when the user clicks the name of an object is outlined in FIG. 3. The "Page Properties" menu 226 contains an item for each of the properties of the page window allowed for change in this embodiment (Background color, Image, and Page title, for example). A method of changing these properties is shown in FIG. 4. The "Utilities" menu contains items permitting the user to set the mouse operation mode between "Drag", "Size", and "Edit" and is explained in FIG. 5. It is understood that there are GUI elements, such as dialog forms, toolbars, tab controls, etc., that can provide the same functionality as the menu shown in the illustration which could be substituted in embodiments of this system.

This disclosure defines storage formats for organizing and storing to a file in a computing device's filing system the data needed to accurately recreate a displayed page. The storage formats are discussed below in reference to FIGS. 11A, 11B, and 11C. This disclosure involves methods for converting a displayed page to a corresponding stored page in a one of the selected storage formats, and for converting a stored page to its corresponding displayed page, and describes methods of saving and retrieving stored pages to and from a file in a filing system. And so, the "File" menu 228 contains a "Save" item which when clicked invokes a method to convert a displayed page to stored page and save the stored page by overwriting or replacing an existing stored page. A "Save" method is diagrammed in FIG. 5. There is also a "Save as" item in the "File" menu the click event of which invokes a method to select a page address to save a new or overwrite an existing stored page and a "Save as" method is diagrammed in FIG. 6. And there is a "Delete" item which allows the user to invoke the method for deleting the stored page of the currently displayed page and a "Delete" method is diagrammed in FIG. 7. There is also an "Open" item which when clicked invokes a method for letting the user specify a page address from which to retrieve a stored page and convert it to the displayed page. An "Open" method is diagrammed in FIG. 8. And there is a "New page" item which invokes a method of clearing all contents from the page window and resetting the window properties to their default values which is diagrammed in FIG. 9.

The developer of an embodiment of this disclosure decides which GUI elements installed with A GUI operating system to permit the user of the embodiment to make GUI documents. It is to be understood that GUI operating systems are designed so that programmers can develop and install their own custom GUI elements on the operating system and can extend existing GUI elements by adding additional properties, methods, and events to existing ones. Once all desired GUI elements are in place, the developer can then decide on those to be included in an embodiment of this disclosure and those so included constitute the presentation elements for making display pages. At the same time, the developer of an embodiment must decide exactly which properties of each GUI element the embodiment will permit the user to modify. With these tasks completed, the developer of an embodiment can then proceed to develop the means for performing the functions described below and diagrammed in FIG. 3 through FIG. 15.

Figure 3:
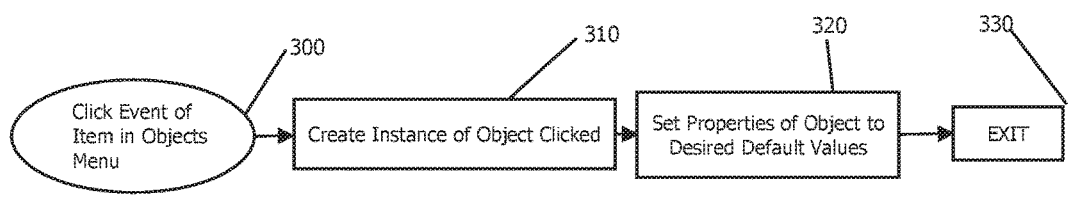
FIG. 3 is a high level flowchart showing the creation and placement of GUI elements in a page window.
Figure 4:
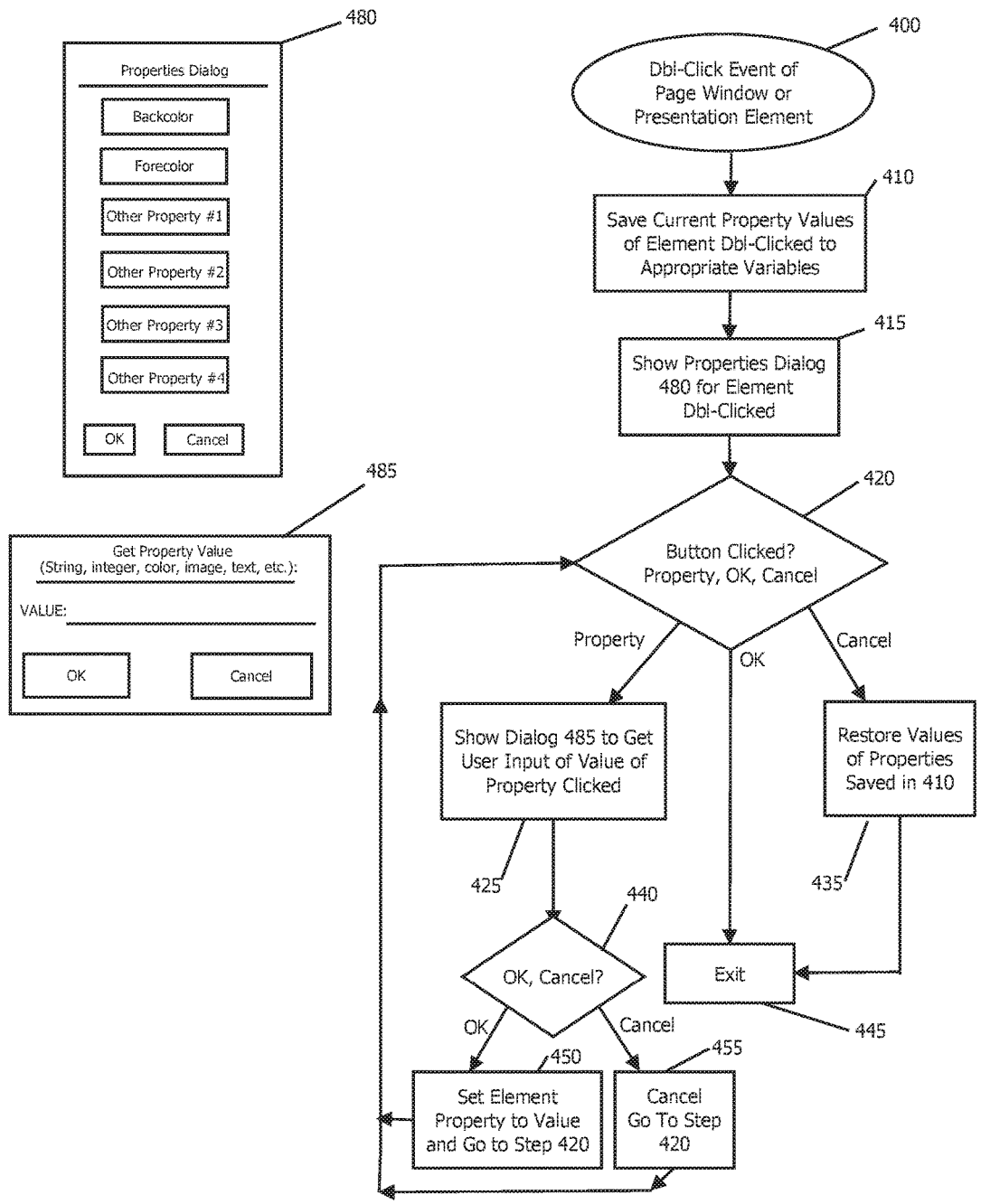
FIG. 4 is a high level flow chart of a method for changing properties of a page window or GUI element in it.

FIG. 3 shows a flowchart 300 of GUI element creation. The method is invoked by the click event of the object item to be created in the "Objects" menu of FIG. 2, 222. Step 310 declares and instantiates the presentation element on the page window (FIG. 1, 200) and step 320 sets the properties of the new presentation element to predefined defaults and step 330 exits. The same method adapted to each GUI element in the "Objects" menu should be repeated in the click event of each object.

FIG. 4 shows a flowchart 400 invoked when the user invokes the double-click event either of the page window (FIG. 2, 205) or a presentation element in the page window (FIG. 2, 215) for changing a property value for each property of the element double-clicked the user is allowed to change. Step 410 saves the values of the current properties of the element clicked to temporary variables in case the user chooses to cancel all changes made. Step 415 presents the user with a Properties Dialog 480 with command buttons for each property the user can change and an OK button to accept changes made and a Cancel button to abort the operation completely. Clicking a property button in step 420 presents a Get Property Value dialog 485 in step 425 for the user to input or select the value of the property. If the user canceled the operation in step 440, step 455 returns the user to step 420. If the user selects OK in step 440, step 450 sets the element's property value to the user's input value and goes to step 420 again. In step 420 if the user selects OK, step 445 exits leaving all the changes to values of properties of the element in effect. If in step 420 the user selects cancel, step 435 restores the original properties of the element from step 410 and then goes to step 445 to exit. GUI operating systems provide color, font, and file selection dialogs developers of embodiments of this disclosure can use to give users the ability to select any value the operating system offers and a means of canceling the operation. For general string and numeric input values, GUI operating systems provide user interface dialogs that also provide cancel operation capability. The property value dialog 485 can be adapted to any specific property value or data type needed for any GUI element.

Figure 5A:
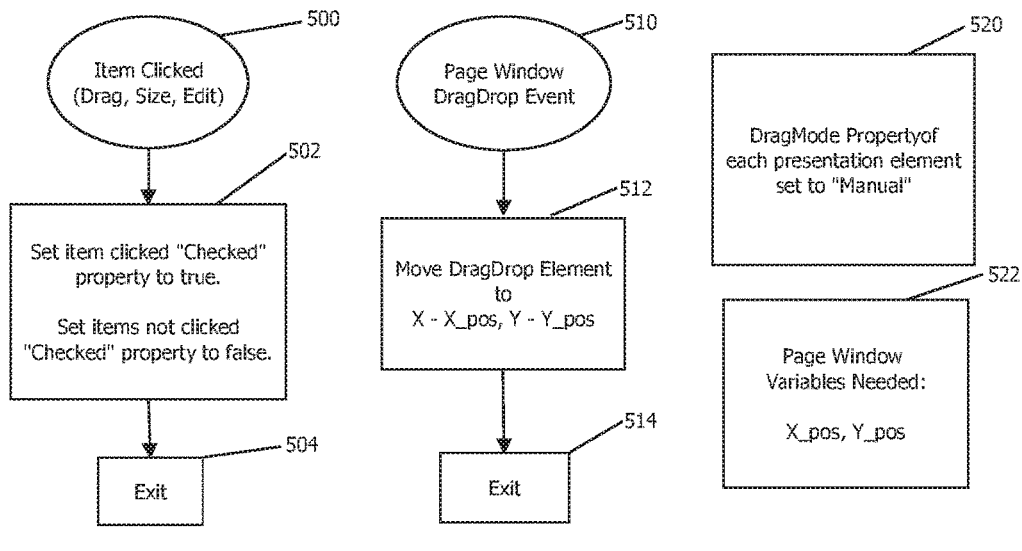
FIGS. 5A, 5B, and 5C are high level flowcharts of methods of changing the position and size of GUI elements in a page window.
Figure 5B:
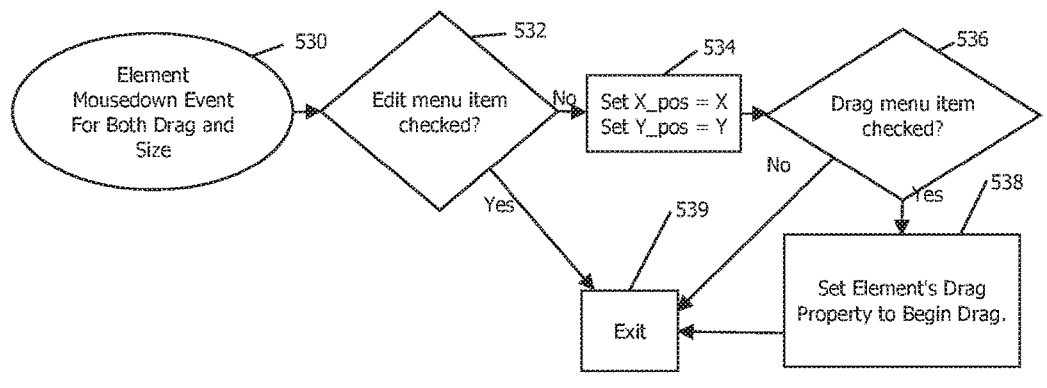
Figure 5C:
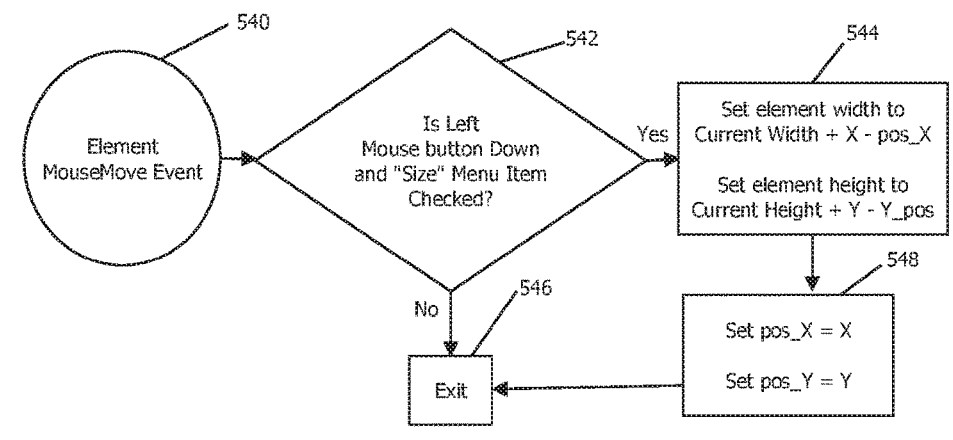

FIGS. 5A, 5B and 5C diagram what implementing methods users can use to change the position and size of presentation elements in a page window. Position and size of presentation elements are properties that developers of all embodiments would probably want users to be able to change in designing page layout and appearance. These properties could be changed by methods offered in a properties dialog such as discussed in FIG. 4, but allowing the user to use the mouse to drag elements into position and size them as desired is discussed here, as good programming practice is to make a task as easy as possible for a user to perform. For purposes of illustration only, the methods diagrammed here are adapted to GUI elements native to Microsoft Windows 98 or later operating systems using any of the Visual Studio suite of programming languages.

The "Utilities" menu (FIG. 2, 230) contains three items, "Drag", "Size", and "Edit." FIG. 5A, 500 shows the flowchart of the click event routine provided for each of these menu items. The step 502 ensures that only one of the three items will have it's "Checked" property set to "True" at any given instant and that a check mark appears next to the item in the menu so the user can see what mouse mode he is in at any given time. The page window (FIG. 2, 205) has a "DragDrop" event which must be programmed as indicated in the flowchart represented by 510 of FIG. 5A. This event is triggered whenever the user releases the left mouse button when finished dragging an element. It automatically moves the element to its new position in step 512. In order to allow the user to drag an element of a given type, the element's "DtagMode" property must be set to "Manual" as indicated in 520. For both dragging and sizing operations, two page window variables, pos_X and pos_Y, need to be defined as indicated in 522.

FIG. 5B shows a flowchart 530 of the "MouseDown" event that must be provided for each element the user is allowed to position or size. In Step 532, if the "Edit" menu item is "Checked," the routine exits without doing anything. In step 534, for both drag and size operations, we set the variables, pos_X and pos_Y, defined in FIG. 5A, 522 to the current location of the mouse, X and Y, as measured from the upper left corner of the element (The X, and Y positions are passed to the mousedown event by the operating system). In step 536, if the "Drag" menu item is "Checked," step 538 is executed to set the element's "Drag" property to begin dragging, otherwise step 539 to exit is executed.

If "Drag" mode is "Checked," the operating system takes over and the user can drag the element to a new position and when he releases the left mouse button, the code represented by the flowchart 510 in FIG. 5A will be invoked which moves the object to its new location using the pos_X and pos_Y values as offsets for determining where to place the element's "Top" and "Left" property values.

FIG. 5C shows the flowchart 540 of the "MouseMove" event that must be programmed for each element the embodiment allows the user to change the size of. Step 542 determines if the left mouse button is down and the "Size" menu item is "Checked". If not, step 546 exits without doing anything. If yes, step 544 calculates the amount in the X,Y directions the user moved the mouse since the last move event (given by X−pos_X and Y−pos_Y) and adjusts the height and width of the element by that amount. In step 548, pos_X and pos_Y are set to the current X and Y position of the mouse so the next move event can calculate how much the X and Y positions of the mouse changed, and step 546 exits.

Figure 6:
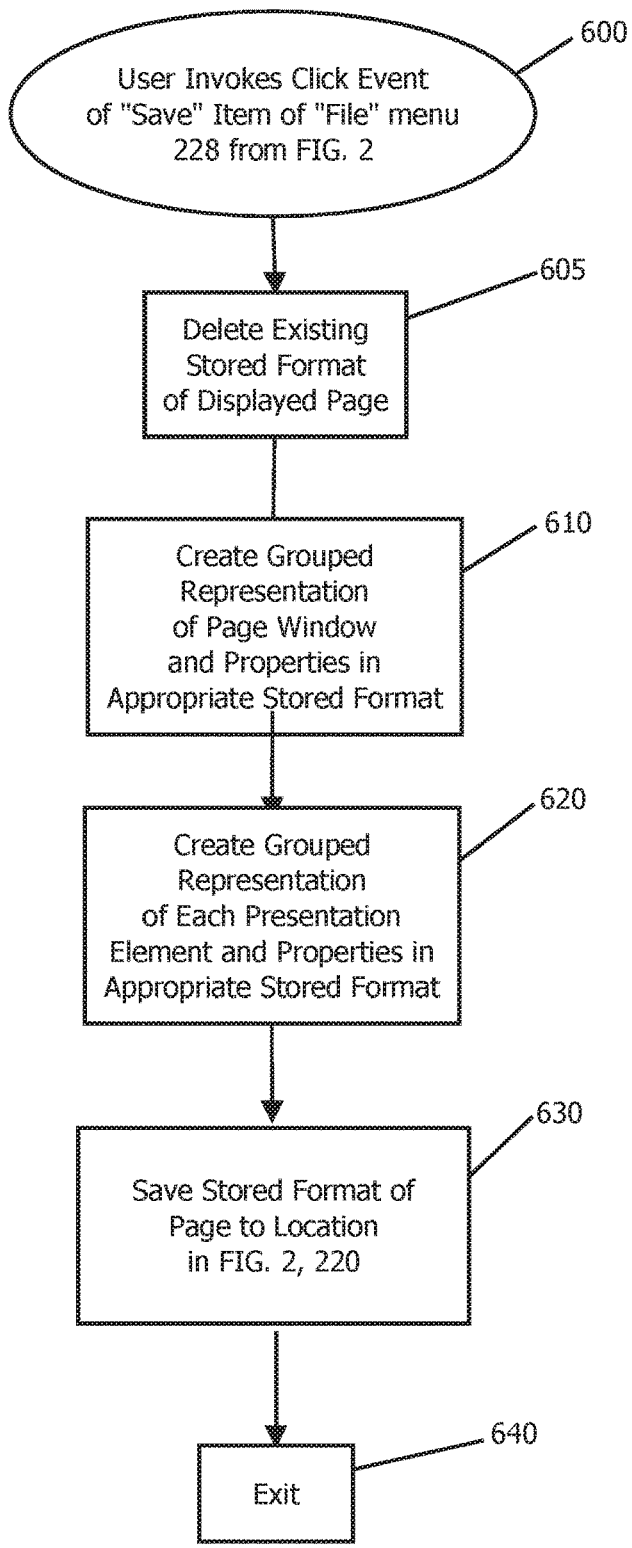
FIG. 6 shows a flowchart of a method to save a page window and presentation elements to a stored format replacing an existing stored format.

FIG. 6 shows a flowchart 600 corresponding to the "Save" item in the "File" menu of FIG. 2, 228 invoked by the click event of the "Save" item. An embodiment of this disclosure may implement any of the storage formats conforming to the rules promulgated in the description below of FIGS. 11A, 11B and 11C, including any of the file stored formats or database stored format discussed there. The "Save" routine is intended to delete an existing stored page (file or database records, for example) and then create a new stored page (a new file, or new set of records, for example) from the currently displayed page. The page address is assumed to have been saved to the variable as in FIG. 2, 220 when the stored page of the current displayed page was retrieved. The flowchart starts with step 605 which deletes the existing stored page, proceeds to step 610 which creates an appropriate representation of the page window and its properties in the storage format decided on in FIGS. 11A, 11B, and 11C for this embodiment, then to step 620 which cycles through the page window and presentation elements one by one to create in memory an appropriate representation of each content element grouped with its property values. In step 630, the new stored page is created at the location specified in the page address variable and step 640 exits and returns program control back to the user.

Figure 7:
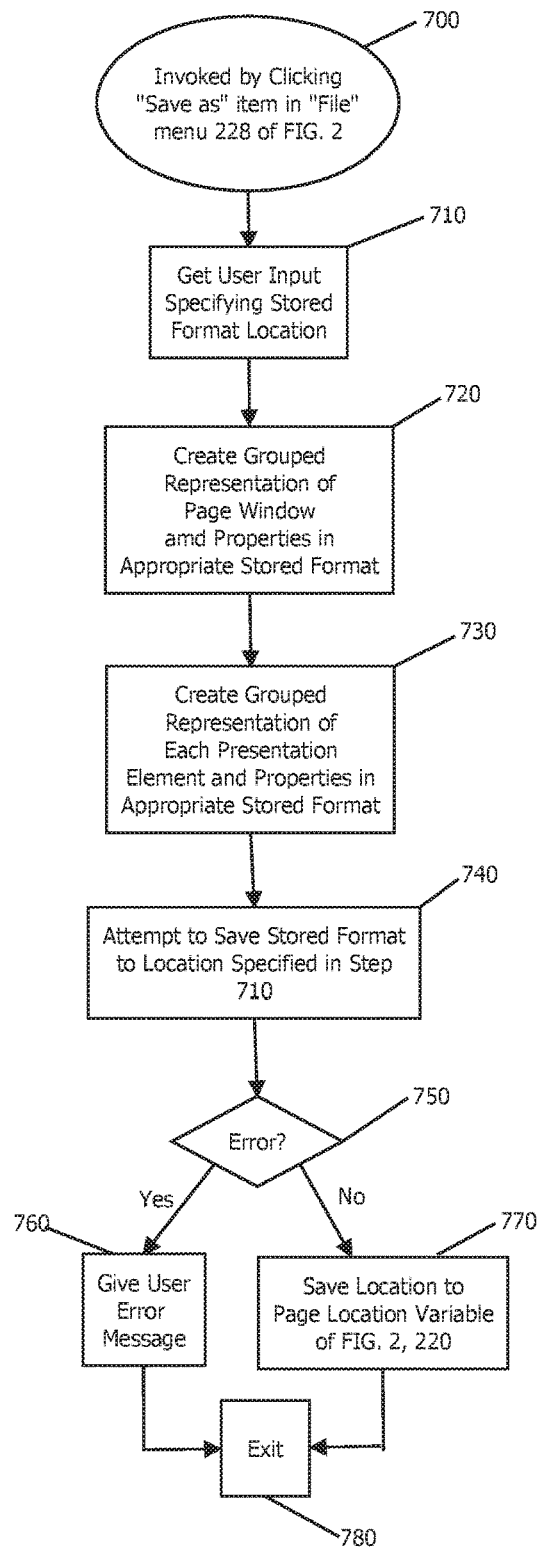
FIG. 7 displays a flowchart of a method for saving a page window and its presentation elements to a new stored format.

FIG. 7 displays a flowchart 700 of the "Save as" method invoked by clicking the "Save as" item in the "File" menu FIG. 2, 228 of the embodiment illustrated here. Step 710 requests user input specifying the page address to be created adapted to the type of stored format used, file or database. Step 720 creates an appropriate stored page representation of the page window, step 730 cycles through the content elements in the page window and creates an appropriate stored page representation for each element, and step 740 attempts to create the stored page at the page address specified in step 710 and in 750 if an error occurs, notifies the user in step 760 and exits. If no error occurs, step 770 stores the page address to the variable in FIG. 2, 220.

Figure 8:
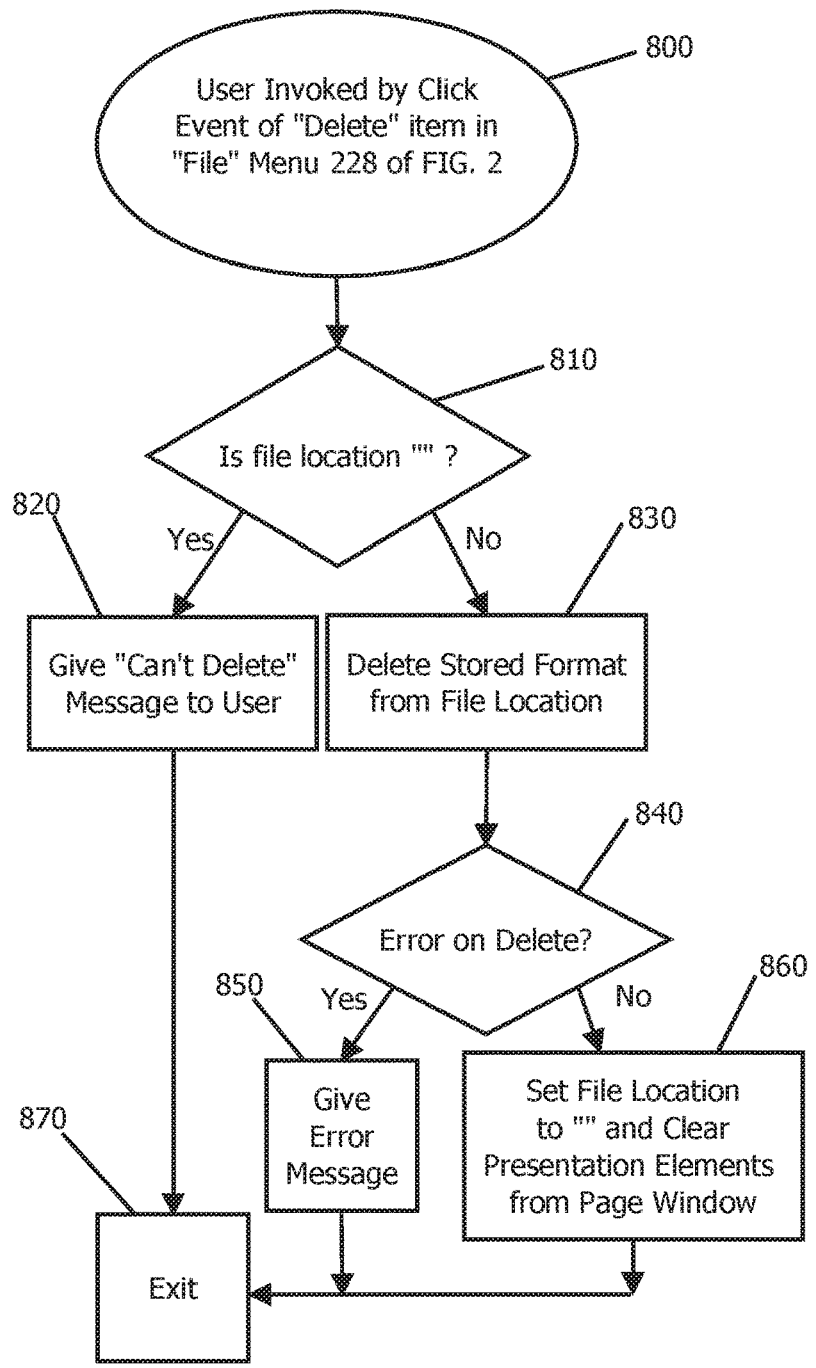
FIG. 8 shows a flowchart of a method of deleting the stored format of the currently displayed page.

FIG. 8 shows a flowchart 800 of the user invoked click event of the "Delete" item of the "File" menu FIG. 2, 228, a method of deleting the stored page corresponding to the currently displayed page. The page address variable (see FIG. 2, 220) is assumed to be " " if no stored page is currently displayed, or a string specifying the page address if a stored page is displayed. Step 810 determines if the page address is " " or not. If it is nothing, step 820 gives the user an error message and goes to step 870 to exit. If the page address in step 810 is not " ", step 830 attempts to delete the stored page. If deletion succeeds in step 840, step 860 deletes all presentation elements from the page window and sets the page address variable to " " and then goes to step 870 to exit. If step 840 shows an error, step 850 gives user an error message and then step 870 exits.

Figure 9:
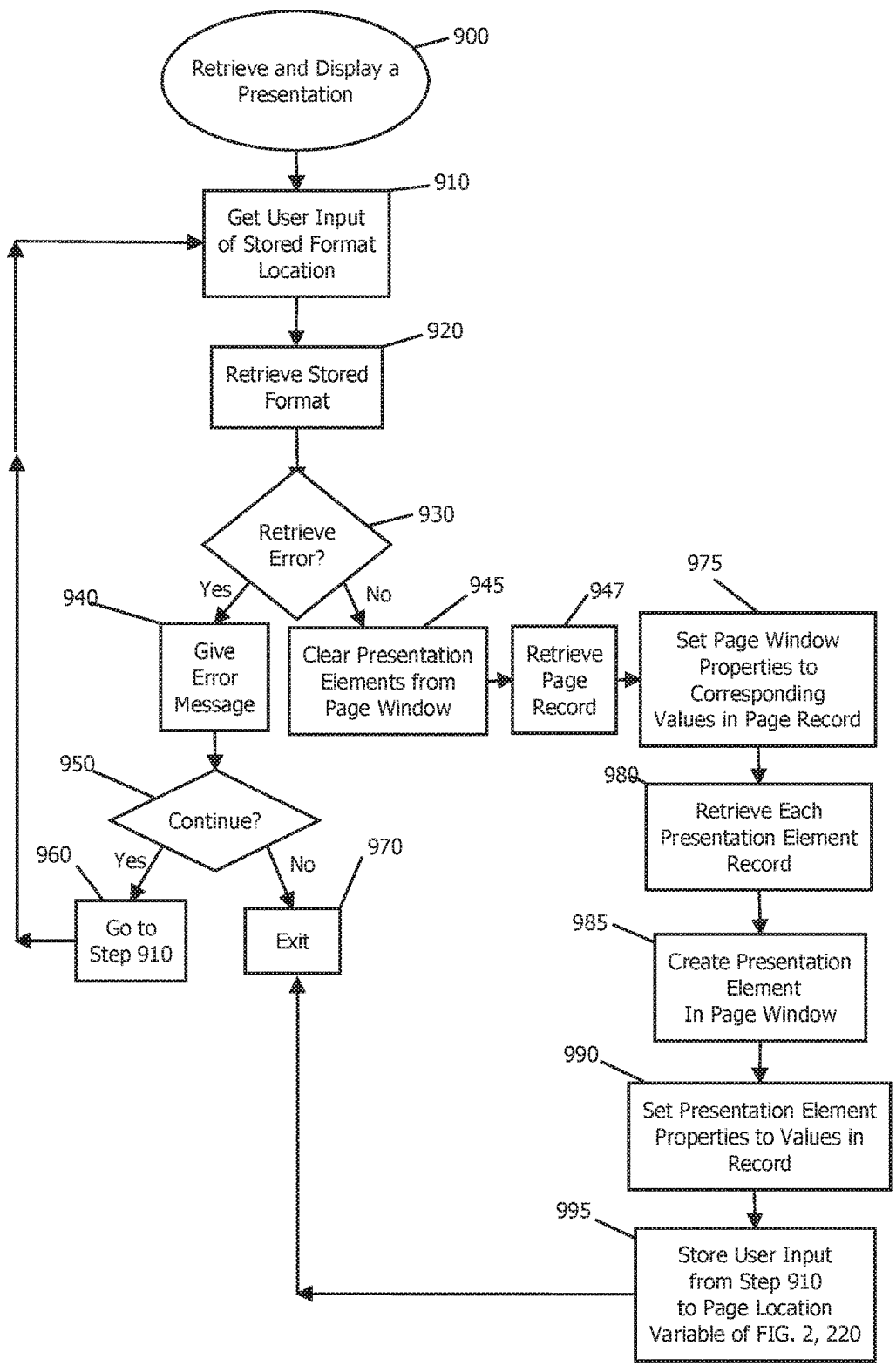
FIG. 9 shows a flowchart of a method of opening, retrieving and displaying a stored format.

FIG. 9 shows a flowchart 900 of a method of opening, retrieving and displaying a page invoked when the user clicks the "Open" item of the "File" menu FIG. 2, 228 of the illustrated embodiment used here. Step 910 requests user input of the page address to be retrieved adapted to the type of stored format used, file or database. Step 920 attempts to retrieve the stored page and reports errors in step 930. If there was a retrieve error, step 940 through step 970 determine if the user wants to proceed and if so control is passed back to step 910, and if not, step 970 exits. Having successfully retrieved the stored page, in step 945 the page window is cleared of all presentation elements and in step 947 the page record is retrieved and in step 975 the page window properties are set to corresponding values in the page record. Steps 980 through 990 retrieve each presentation element record, create the element in the page window, and set its properties according to the corresponding values in the element record. Step 995 sets the variable of FIG. 2, 220 to the page address input in step 910 and exits in step 970.

Figure 10:
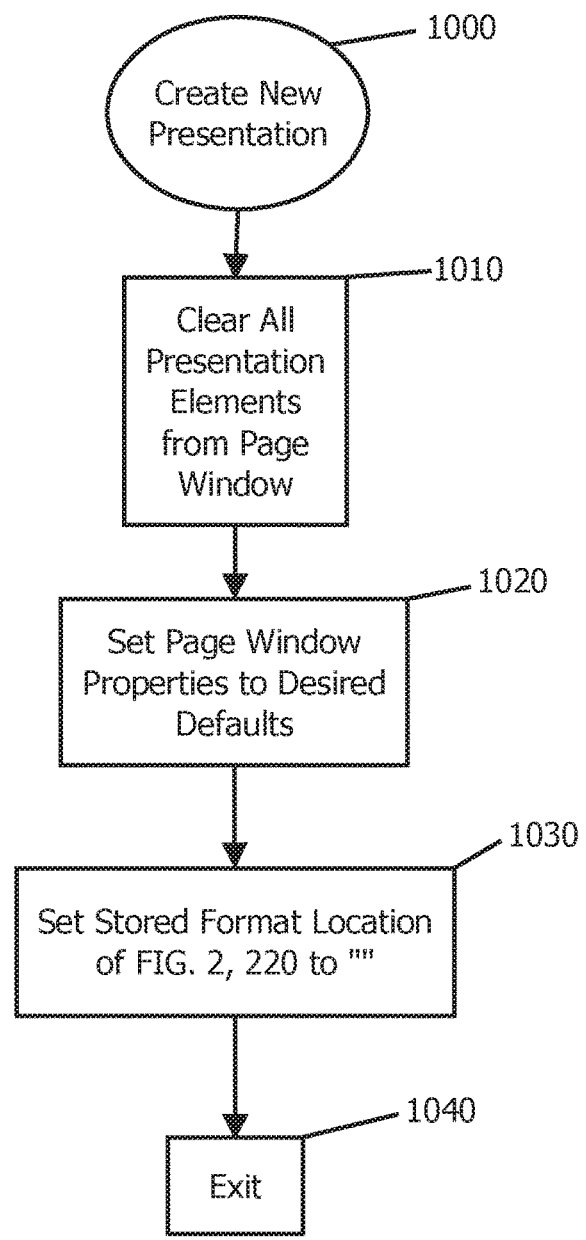
FIG. 10 is a flowchart of a method of clearing a page window of all contents.

Diagrammed in FIG. 10 is a flowchart 1000 of a method of creating a new displayed page invoked by clicking the "New page" item in the "File" menu of FIG. 2, 228. Step 1010 clears all presentation elements from the page window, step (1020) resets the page window properties to their default values and step (1030) sets the variable (FIG. 2, 220) to the empty string, " " and step 1040 exits.

FIGS. 11A, 11B, and 11C identify several stored formats that can be used to save all data needed to recreate a given displayed page.

Note that any GUI element in a GUI operating system can be completely described by its class name coupled or grouped with the values of each of its properties. In this disclosure, an embodiment may identify a subset of all properties that it allows users to change. This subset along with a name to identify the element is then all that is needed to define a GUI element so that it can be accurately reconstructed on a computer monitor. Thus, a text box can be defined by where it is located in the page window, what its height and width are, what its background color is, what text it contains, what font name, style, color, and size the text is, and any other property values that are decided on for users to change. Those properties not allowed for users to change can be set by embodiment developers to any desired default values they choose.

To completely describe the presentation elements as they appear in a page window so that it can be accurately redrawn, one needs to identify, specify, or name each element (page window and each presentation element it contains) grouped with the values of each property.

Based on the above, any file or extractable portion of a file which conforms to the three rules given below can be used as a basis for creating an embodiment of this disclosure:
1. Each element (page window or presentation element) must be grouped in a file with the values of the element's properties that are allowed to be changed.
2. The page window element must be grouped in a file with all and only the presentation elements contained in the page window.
3. Any presentation element which can contain other presentation elements must be grouped with the presentation elements it contains.

FIG. 11A, 1100 shows an ascii file format #1 similar to a delimited ascii text file that can be used as a format for storing the data needed to recreate pages of this disclosure. The format involves a single ascii text file saved to a computer filing system in which each line of text represents the name of either the page window or a type of presentation element (Label or TextBox, for example) followed by name/value pairs as "propertyname=value" separated by commas.

FIG. 11A, 1110 shows ascii format #2 that also qualifies. In this format, the name or identity of the page window or presentation element is followed only by the property values themselves, the property corresponding to a value being determined by the value's numeric position in the list counting from left to right. As long as all computer routines which read or write the lines follow the specified order, this format will work fine.

It will be observed that formats 1100 and 1110 conform to the rules (1) and (2) above defining the metes and bounds of formats suitable for embodiments of this disclosure (the third rule is discussed on the next page). Note that ASCII text files cannot contain binary data such as images. Images can be referenced in ASCII files by giving the directory path and filename in the form, for example, "image=\path\filename.ext." Also note that text values can be contained between quotes and that if the text contains quotation marks, an additional quote character can be used to escape the quote in the text allowing it to appear in the displayed element. Note also that care must be taken in converting values in name/value pairs to the corresponding data type of the element property (such as integer, single, double, string, etc.) designated in documentation for each GUI element used.

FIG. 11B, 1120 shows still another ascii text file format that can be used. It is prepared using Extensible Markup Language (XML) in compliance with the standards set by the World Wide Web Consortium.

It should be noted that in all three example formats above, any ascii text file editor can be used to directly prepare stored pages of this disclosure just as is done in creating web pages using HTML. But that would be a lot of work and subject to many errors, as is HTML document preparation. It is much easier to use the point and click and drag and drop methods to directly design display pages using the methods discussed above and below and then let the computer create and save the stored page for you.

FIG. 11C, 1130 shows still another example format that can be used to store the data describing a displayed page of this disclosure, the database format. A "Pages" table 1132 contains a field, Page_ID, for the unique name of each page and named columns for each page property the user is allowed to change. And an "Objects" table 1134 that has a Page_ID field for the unique name of the page it belongs to, and a field for the class name of the object, and a field for each property the user can change. In the illustration presented here, the "Objects" table is constructed so that all properties of all presentation elements are represented by a field in the table. Some objects will not use all fields of the "Objects" table. An alternative could employ a separate table for each object type containing just the properties needed for the object. FIG. 11B, 1136, shows a "Pages" table containing three pages and an "Objects" table containing the presentation elements associated with each page.

In the examples of suitable stored formats for a page described above, all three of the ascii text file formats involve a single file in a computer's filing system. These will hereafter be referred to as a file stored format. The fourth example involving storage of page data in the tables of a database will hereafter be referred to as a database stored format. It is understood that an embodiment of this disclosure could be developed which employs more than one of the stored formats discussed above. And it is understood that the "Save", "Save as", "Delete" and "Open" methods corresponding to FIGS. 6, 7, 8, and 9 respectively would need to be adapted to handle whatever stored formats are employed. For example, if a database format is used in connection with a database management system (DBMS) that is compliant with Structured Query Language (SQL), then SQL select, update, delete, and insert statements can be used in "Open", "Save", "Delete", and "Save as" routines respectively.

It should be understood that all stored formats in compliance with the format rules discussed above can also be adapted to handle embodiments using GUI elements that can contain other GUI elements, forming hierarchies, and can therefore be in compliance with rule (3) above. Thus the ascii text file formats of FIG. 11A can use the tab character in subsequent lines of text to indicate the element is contained within a previous element. Thus, below is shown a Page containing two PicBox elements with the first PicBox element containing three elements, one of which is a third PicBox element containing additional elements.

Page: . . .
PicBox: . . .
TextBox: . . .
PicBox: . . .
   TextBox: . . .

Label: . . .
Label: . . .
PicBox: . . .

The XML stored format of FIG. 11B and the database stored format of FIG. 11C are well known by those skilled in the art for their ability to represent hierarchical data.

FIG. 15 shows the standard ways in which the addresses or locations of GUI documents in the stored formats discussed in FIGS. 11A, 11B, and 11C can be specified. These specifications are intended to be saved in the page address variable of FIG. 2, 220 corresponding to the display format of the current page. These specifications are also to be directly typed in by users of the "Save as" (FIG. 7) and "Open" (FIG. 9) methods. And these specifications are also to be saved as the links to other GUI documents as described in FIGS. 12, 13, 14A, 14B, 14C, and 14D The phrase, "page address" has been used frequently in this application and is synonymous with "the location of a file in a computing device's filing system containing the stored format of the data representing a page (GUI document) as defined in this application." The computer industry is quite standardized as to exactly how to specify the location of a file in a filing system but there are minor differences between systems. Most computer filing systems are based on storage devices based on the directory tree concept. In most systems, a specially formatted character string data type is used to specify the path in a directory tree to a file. FIG. 15 shows the generic formats used for addressing files in Microsoft operating system filing systems. 1510 shows the generic format and an example for addressing files in the Local Filing System (LFS) of a computer. 1520 shows the generic format and an example for addressing files using the Microsoft Universal Naming Convention (UNC) that would be used for addressing files on computers connected in a Local Area Network (LAN). 1530 shows the generic format and an example for addressing files using the Uniform Resource Identifier for use when files are served from server computers connected in a Wide Area Network (WAN), such as the internet or an intranet.

Designating a file location for the stored format data when the data is stored as records in the tables of a database is not a problem. A developer of an embodiment of this disclosure using a database for the stored pages need simply adopt any workable, specially formatted convention for specifying a DBMS server, the name of the database containing the stored format, and the name of the page in the Page_ID field of the pages table. For example, below is a convention that will work for most database servers:

DBMS://Server/Database/PageIdentifier

Thus, "DBMS://www.myserver.com/somedatabase/pagename" will work because the "DBMS:" prefix can be used by software to distinguish between the file formats above (LFS, UNC, and URI) and database format. The software can then parse the server location and database name to connect to the server and open the database. Then use the name of the page to form the needed SQL select statements for requesting the page record and the associated presentation element records from the tables in the database which need to have the same table names, field names, and data types across all databases to be used. The above format could be used for the current page address variable of FIG. 2, 220 or any where else the page address is needed. FIG. 15, 1540 shows the generic format and an example for addressing database stored formats of GUI documents.

Now the method of creating, deleting, editing, and invoking links is discussed. A link is defined here as all or part of a displayed GUI element or a portion of a property of a displayed GUI element visually distinguishable from other parts or portions of said GUI element or property thereof which is associated with a page address of a different page and which is also associated with a user invokable event which causes the retrieval and conversion of the stored page at the page address to the display format of the associated page. As defined, a link in this disclosure is the functional equivalent of the href element called a hyperlink in HTML documents.

Here are some examples of links which can be implemented in the system of this disclosure as described. A label is a GUI element in most GUI operating systems and as a whole could be associated with an event, such as left mouse button down, and this event could be programmed to retrieve a stored page and display the corresponding display page. A combo box or list box contains discrete text entries, each of which can be associated with a link which is invoked when the item is clicked or selected. In an ordinary text box GUI element, the text property can contain visually distinguishable words or phrases between, for example, square brackets (such as "[this is a link]") such that when the mouse pointer is positioned over the text and the left mouse button is pressed, the mouse down event is programmed to retrieve the stored page at the page address and display the corresponding display page.

Figure 12:
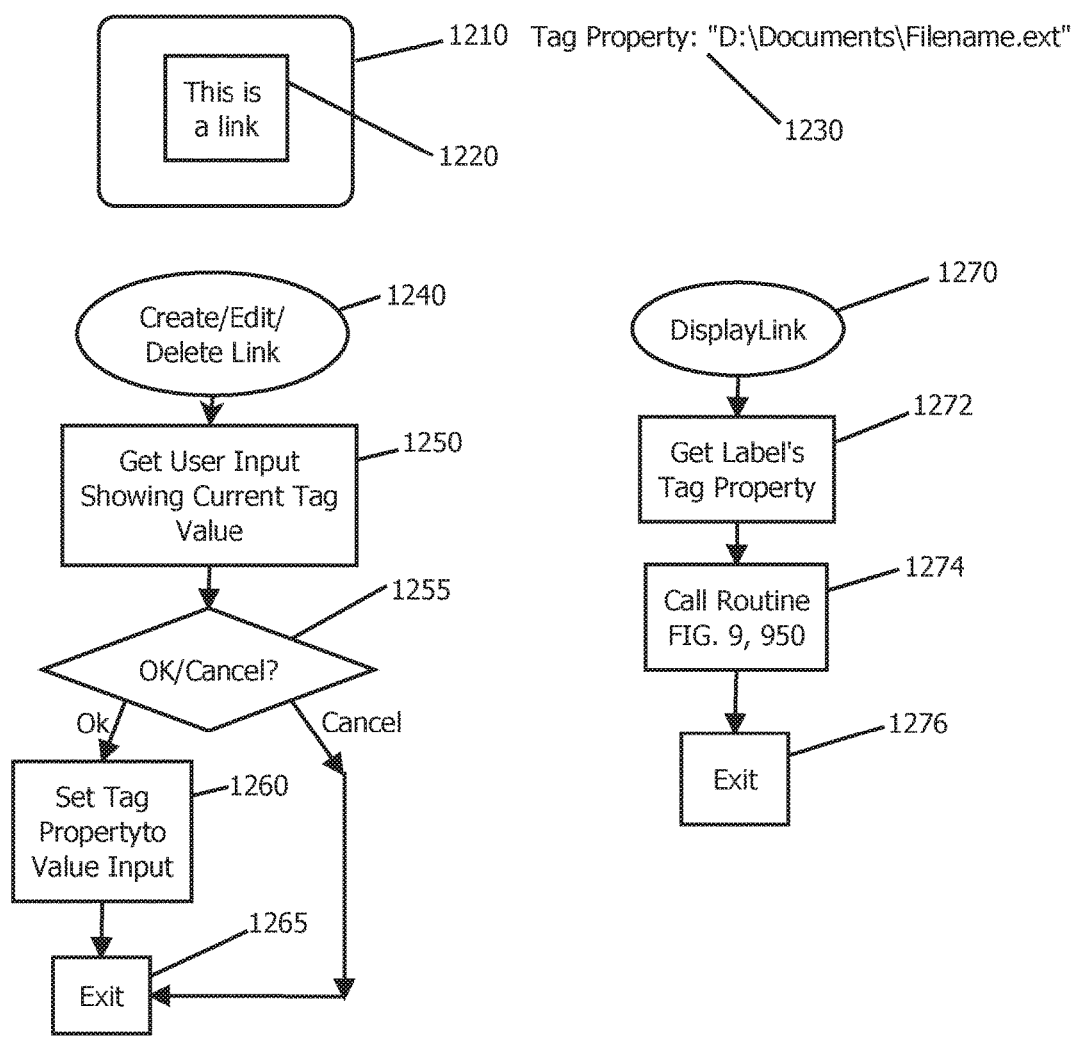
FIG. 12 shows flowcharts of methods for implementing links in a label.

FIG. 12 shows how to implement a link for a label as discussed above. For illustration only, FIG. 12 uses the label GUI element of a Microsoft windows 98 or later operating system. The label has a property named "Tag" which is a string data type and it is provided for programmers to use for any purpose imaginable. A label 1220 is shown displayed in a page window 1210. The Tag property 1230 of the label is used to contain the page address of a different page presumed to be located in a filing system accessible to the local computer. Creating, editing, and deleting a link can be accomplished as indicated in flowchart 1240 invoked by an event, for example the label's right click event. In step 1250 the user is presented with an input dialog showing the current value of the label's Tag property and "Ok" and "Cancel" buttons. The user can delete, edit, or replace the existing value. The User's choice is processed in step 1255 which either accepts the user input in 1260, or exits in step 1265.

A flowchart 1270 of a method in the click event of the label is shown which in step 1272 will retrieve the label's Tag property string containing the page address and then in step 1274 call the routine represented by the flowchart 950 of FIG. 9 for retrieving and displaying the stored page at the page address specified in the label's Tag property.

This implementation of a link requires the stored format, either file or database, for a label grouped with its properties as described in FIG. 11A, 11B, or 11C needs to include a position or field for storing the string value of the Tag property to the stored page so that it gets saved whenever the user invokes a save method as described in FIG. 6 or 7. Additionally, Step 930 of FIG. 9 needs to be adapted to read the stored format location specification associated with the label and set the label's Tag property to it during conversion of the page stored format to the display format.

FIG. 13 shows how entries in a list box can be used to implement links. For illustration, a Microsoft Windows 98 or later list box containing several entries (1310) is shown in a page window (1320). The list box has a Tag property provided for programmers to use in any way they choose. The Tag property is a string data type and is shown in (1330) to contain a specially formatted string employing 0 or more "|" characters, each of which separates a page address, if one. It is also assumed for purposes of this illustration that the embodiment used for this example enforces the rule that every item, n, as counted from the first or topmost item in a list box has a corresponding "|" character in the Tag property string being the nth "|" character counting from the left of the string and that the page address corresponding to an item is always placed to the left of the "|" character corresponding to the item. Thus, a list box with four entries in which no entry is associated with a stored format location will have a Tag property string like this—"||||", and the Tag property string of the same list box in which the third item has a link associated with it will look like this, "|||D:\Documents\File.doc||". As another example, if the Tag property contains "|D:\Documents\file1.doc||D:\Documents\file2.doc|", then this tells one that there are four entries in the list box and that the first and third entries do not have a stored format location specification associated with them, but the second and fourth do. In order to guarantee that the Tag property always conforms accurately to the above rule, methods for inserting or deleting entries in a list box must also insert or delete "|" characters in the Tag string in the corresponding locations. These methods are not described in detail here because it is believed that, after studying FIG. 13, these methods would be derivable by those skilled in the art without undue experimentation.

The flowchart (1340) can be associated with the right click event of the list box and illustrates steps for retrieving and displaying the page associated with the entry selected in the list box, if one. In step 1342, a variable, n, is set to the number counting from 0 of the selected item in the list box and in step 1344 the Tag property of the list box is converted to an array the nth element of which is selected in step 1346. In step 1348, if the element is empty execution is passed to step 1352 to exit. If not empty, step 1350 passes the value of the nth element to the retrieve and display routine represented by the flowchart of FIG. 9, 950 and then exits.

FIG. 13, 1360 shows the flowchart of a method for editing or deleting a stored format location specification associated with an entry in a list box. The event to invoke this method might be the simultaneous pressing of the Ctrl/Alt/L keys after selecting an item in the list box. If there isn't a link associated with the selected item, the user can create one. If there is one the user can modify or delete it. In step 1362, the variable, n, is set to the number counting from 0 of the selected item. Step 1364 converts the Tag property string of the list box to an array and step 1366 selects the nth element of the array. Step 1368 presents the user with a dialog displaying the value of the nth element in a text box and containing an "Ok" and a "Cancel" button. In step 1370, if the user clicked "Cancel," control is passed to step 1376 to exit, but if the user selected "Ok," step 1372 sets Array(n) to the user input value (presumed to be a valid page address) and step 1374 converts the array back into the Tag property string and exits in step 1376.

The storage format, either file or database, for a list box grouped with its properties as described in FIG. 13 needs to include a value or field for storing the string value of the Tag property, and a position or field for storing the list box entries in order from top to bottom as they appear in the list box to the storage format so that it gets saved whenever the user invokes a save method as described in FIG. 6 or 7. The list box entries, for example, can be stored as a string in which each entry is saved in the string in the same order it appears in the list box, separated by the "|" character or equivalent method. Thus, using the entries as they appear in FIG. 13, 1310, the string value, "item one|item two|item three" can be stored in the position or field representing the items in a list box. It is understood that the method of retrieving and converting a stored page to its display format must be adapted to the use of list box entries to associate with links by providing a means of saving the position or field representing the links associated with the entries to the Tag property of the displayed list box when created.

Figure 14A:
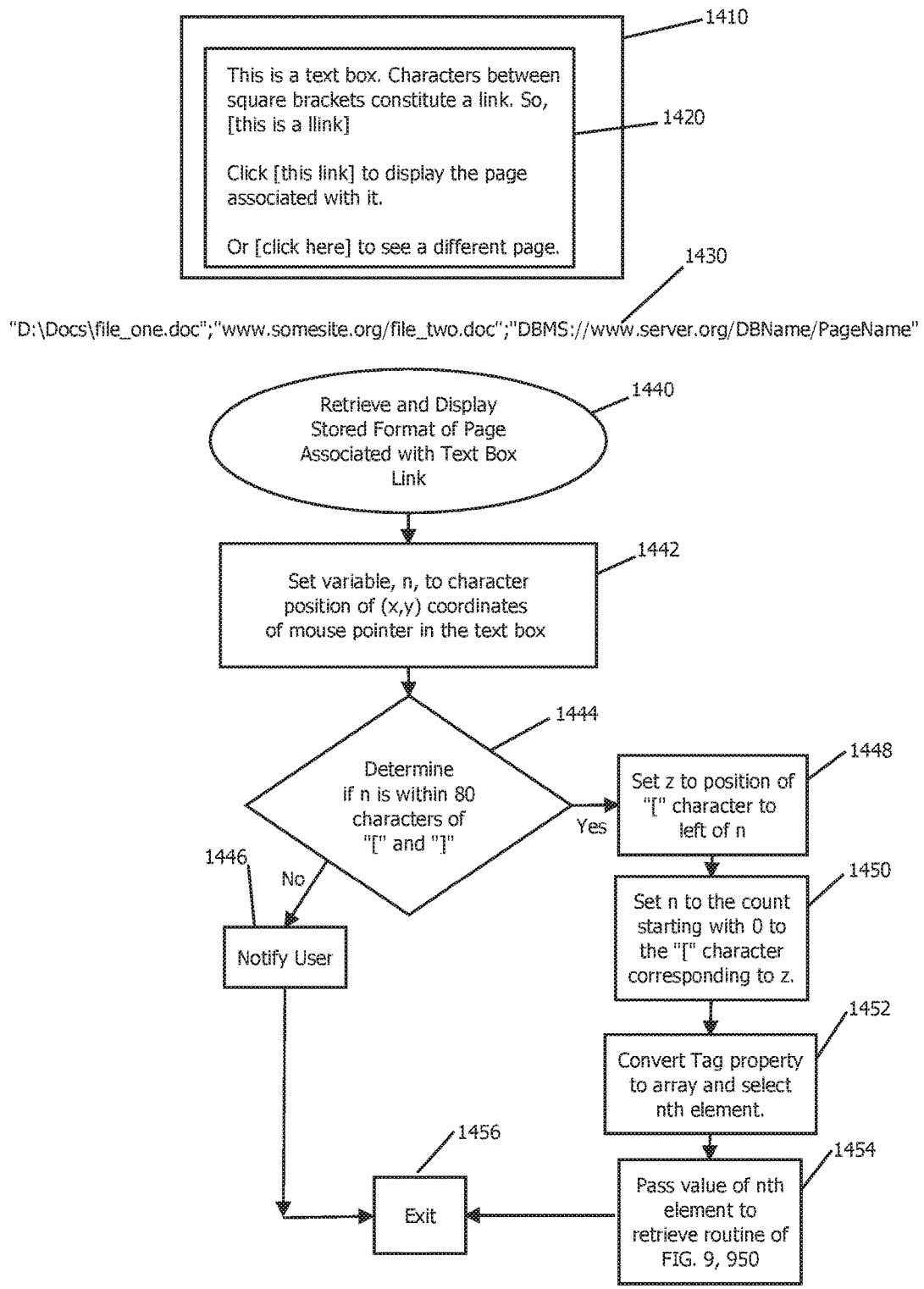
FIGS. 14A, 14B, 14C, and 14D show flowcharts of methods of implementing links in a plain textbox.

FIGS. 14A, 14B, 14C, and 14D shows a method of using specially marked text in a text box as discussed above to implement links. For illustration only, a Microsoft Windows 98 or later text box is used. The text box only supports one font in one style, size and color, so using underlined text of a certain color to connote a link, as is typical for the href element in HTML, is not an option. So for this illustration text between square brackets is arbitrarily used to connote a link. A page window FIG. 14A, 1410 is shown with a text box 1420 containing several blocks of adjacent characters between square brackets, each block representing a link. The text box has a Tag property of string data type provided by Microsoft for use for anything a programmer wants. In this illustration, the tag property is used to store the associated links in the same order as the square brackets appear in the text property of the box. The string is specially formatted as shown in 1430 to contain the page addresses between semicolon ";" characters in the same order from left to right as the bracketed text representing the links appears from the beginning to end of the text property of the text box. A link in this illustration is also limited to a maximum of 80 consecutive characters. The click event of the text box invokes the method represented by flowchart 1440 to retrieve and display the stored page associated with the text between square brackets, which in step 1442 determines the character position of the mouse pointer from the (x,y) coordinates of the mouse pointer in the text box, and in step 1444 determines if the character position of the mouse pointer is within 80 characters of "[" and "]" characters. If the mouse pointer is NOT between square brackets, step 1446 notifies user and then exits in step 1456. If step 1444 determines the mouse pointer is between square brackets, then in step 1448, the variable, z, is set to the position of the "[" character in the text property. Then in step 1450, the variable, n, is set to the number of "[" characters in the text of the text property from the beginning of the text to the position, z, of the "[" character belonging to the link counting from 0. In step 1452, the Tag property of the text box is converted to an array, and the nth element of the array corresponds to the page address corresponding to the link clicked by the user. Then in step 1454, the value of the nth element of the array is passed to the routine represented by flowchart 950 described in FIG. 9 to retrieve and display the page corresponding to the page address. And the routine exits in step 1456.

Figure 14B:
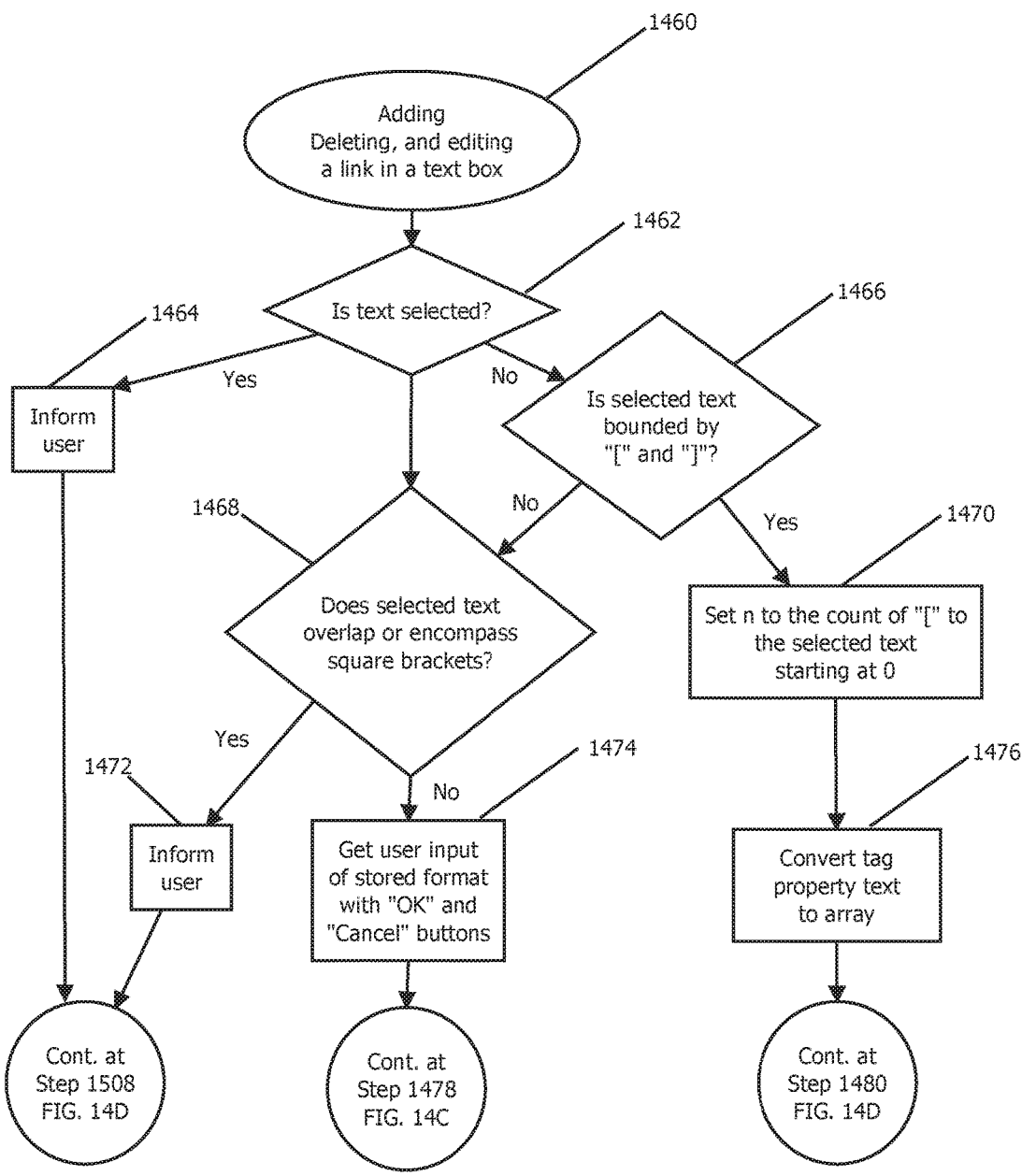
Figure 14C:
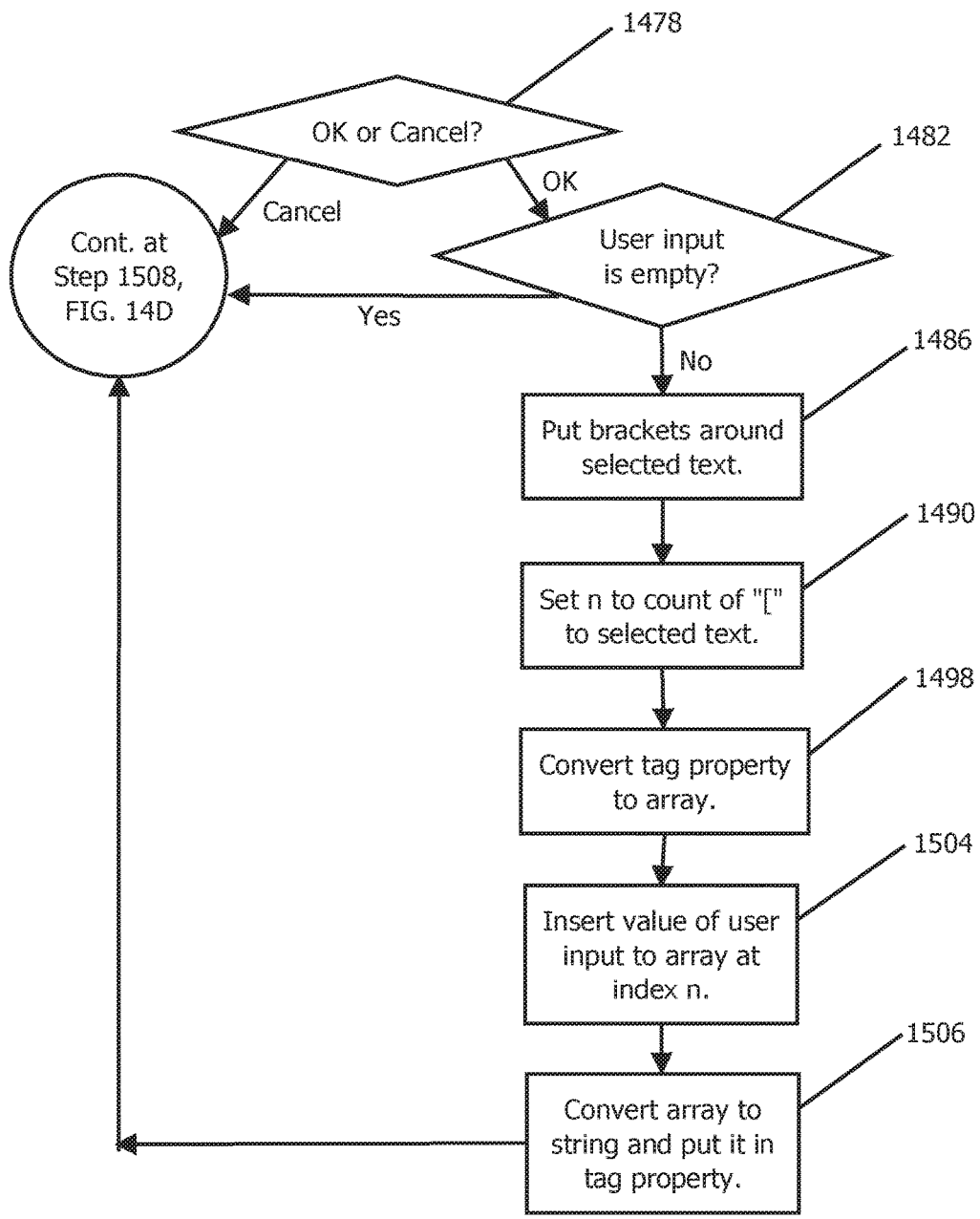
Figure 14D:
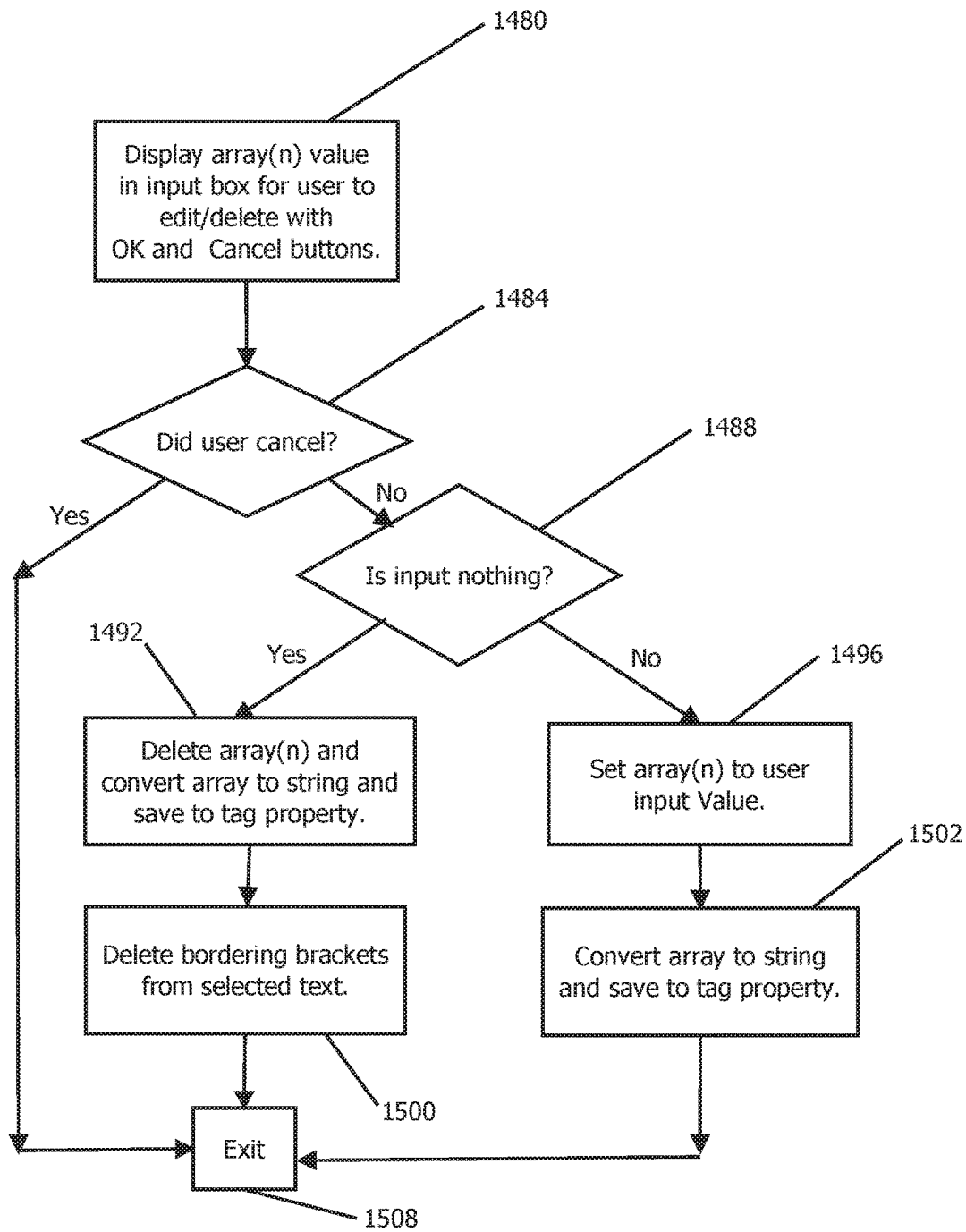

FIGS. 14B, 14C, and 14D shows a single flowchart spread over three drawings of a method of adding, editing, or deleting a link in a text box. For illustration only, to invoke this method the user is required to select the text between square brackets of an existing link he wishes to edit or delete, or select text that does not overlap with text between square brackets to convert to a link. Then to add, delete, or edit a link the user must invoke an event as indicated in 14B, 1460. For illustration only, the event is the pressing of the Ctrl/Alt/L keys simultaneously. Step 1462 determines if any text is selected and if not gives error message in step 1464 and continues to FIG. 14D, step 1508 to exit. In step 1466, if the selected text is not between brackets step 1468 checks to see if the selected text overlaps any square brackets. If so, step 1472 notifies the user and continues to FIG. 14D and exits in step 1508. In step 1474 it has been determined that a new link can be created and the user is shown a dialog where he can enter the page address desired or select "Ok" or "Cancel." The flowchart continues to FIG. 14C where In step 1478, if "Cancel" is selected step 1508 of FIG. 14D exits. If "Ok" is selected, step 1482 of FIG. 14C examines the value input by the user. If empty or nothing, step 1508 of FIG. 14D exits. If not nothing, step 1486 puts brackets around the selected text, and step 1490 counts from 0 to the "[" character immediately before the selected text and sets the variable, n, to the count, which determines where the new link is being inserted. Step 1498 converts the Tag property text to a 0 based array and step 1504 inserts the user's input (presumed to be a valid page address) into the array at the counted position, n. Step 1506 then converts the array back to a string and saves it to the Tag property and processing continues in FIG. 14D where step 1508 exits.

Back in step 1466 of FIG. 14B, if the selected text is bounded by brackets, it is assumed the user wants to either edit the existing link or delete it. Step 1470 counts from 0 to the "[" character just before the selected text and sets the variable, n, to the count. Step 1476 converts the Tag property string to an array, and processing continues in FIG. 14D where step 1480 displays the text in the array element corresponding to the count in FIG. 14B step 1470 and displays an "Ok" and "Cancel" button. The user is free to edit the link or delete it altogether and then click one of the buttons. Step 1484 examines the user action. If "Cancel" was selected, step 1508 exits. If the user clicked "Ok", step 1488 examines the user input. If it is nothing, step 1492 deletes the array element corresponding to the count of step 1470 in FIG. 14B and then converts the remaining array back to a string and saves it to the Tag property, and step 1500 deletes the brackets surrounding the selected text and step 1508 exits. On the other hand, if user input in step 1488 is not empty or nothing, the value (presumed to be a valid page address) is saved in step 1496 to the array element corresponding to the count in step 1470 of FIG. 14B, and step 1502 converts the array to string and saves it to the Tag property and step 1508 exits.

It is to be noted that the use of square brackets in text boxes to connote links can only work effectively if users abstain from typing or pasting their own square bracket characters in a text box. A well designed embodiment of this system would provide means of preventing users from typing square brackets in text boxes used as presentation elements, and a means of preventing copying and pasting square brackets from external documents (or replacing square brackets with another character), and a means of handling links that are copied or cut and pasted from one text box to another or to a different location in the same text box. Those skilled in the art should be able to provide such means without undue experimentation.

As with the HTML World Wide Web, international standardization of GUI DMS would be preferred in many embodiments. Standardization may require the development of a standard set of GUI elements for use in GUI DMS browsers on all GUI equipped operating systems to achieve a uniformity of appearance and functionality across all platforms. As with the HTML web, GUI DMS standardization may require, for example, a set of fonts and colors to be used on all platforms. Standardization may also require agreement as to GUI document storage formats to be used and agreement as to internet file transfer protocols to use (HTTP, FTP, etc.). Standardization may be required in the means for uniquely addressing document storage format addresses.

In preferred embodiments, at least three read-write engines for storing and retrieving GUI documents a page at a time in (1) XML format, (2) records in database format, and either CSV or JSON format may be implemented. The preferred embodiments may also employ multiple GUI elements to maximize GUI DMS's ability to provide maximum digital information for perceiving (hearing, viewing) and interacting with digital information including digital text, graphics, tabular data, images, audio, and video and for maximizing interaction with them. Furthermore, the preferred embodiments may employ GUI elements that can contain other GUI elements permitting the development of hierarchies of elements within elements. Further still, the preferred embodiments may also permit users to select multiple elements on a page and save them to their local computer for personal user or for import/export to other GUI DMS documents. Preferred embodiments may further implement the use of a scripting language to permit programmability of GUI documents to achieve GUI documents that are functionally equivalent to HTML web applications and services. In some of the preferred embodiments, a GUI browser capability to create database tables in either or both SQL and NoSQL databases may be implemented along with means for incorporating such data into custom forms or data grids permitting users to create, retrieve, update and delete (perform CRUD operations) on data records in such databases. Additionally, preferred embodiments may implement a means permitting users to enter the unique address of text files, images, video and audio files, etc. for automatically retrieving the file and displaying it in a compatible GUI element placed in the currently displayed page so that the user can size and position it with other content on the page thus permitting aggregation of content from multiple sources within a GUI document, and further provide a means for the user to leave the source document in place and just save the address to it in his document as well as to save it to a file accessible to his local computer. Further still, the preferred embodiments may also implement a means of defining and including a set of GUI elements to be repeated in every GUI document, such as page headers and footers, side bars, etc. The preferred embodiments may also include the implementation of a cascading style sheet (css) system as is achieved in HTML. The preferred embodiments may also implement tabbed browsing as implemented in most HTML browsers for allowing a user to display and work with multiple pages at a time.

It should be understood that, although embodiments of the present disclosure are described using conventional terms and examples which may relate back to conventional tools, the scope of the present disclosure does not confine the embodiments to such conventional tools. By way of non-limiting example, in 2006, Microsoft released its first version of a new GUI interface which it termed the Windows Presentation Foundation (WPF) and it is a part of their .NET framework version 3. It differs significantly from it's earlier GUI now called WinForms. WinForms is still supported in the .NET framework and in fact is also compatible with WPF. Although certain aspects of the Detailed Description section of the GUI DMS patent may relate to tools such as, for example, WinForms, it must be understood that WinForms and WPF are merely non-limiting examples which may be used as a reference point for understanding and enabling the present disclosure.

The computer industry is rapidly changing and this applies to GUIs. The present disclosure should not be construed to be tied to one particular GUI, past, present, or future, such as WinForms. The future may bring new and different GUI's. Any suitable means to implement a fully read-write GUI DMS based document software (a GUI browser which is fully read-write and which can support hyperlinking between pages to form document webs) should be construed as falling within the metes and bounds of the present disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The foregoing detailed description of the inventive system, called a GUI document management system, has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

The following is claimed:

1. A method for providing an alternative to the existing world wide web, known as a graphical user interface (GUI) web, comprising GUI browsers as alternatives to existing hypertext markup language (HTML) web browsers, the method comprising:
    providing a GUI web-browser with functionality to create, edit, and retrieve GUI documents as GUI web pages, the GUI web-browser comprising a page window displaying the GUI documents as the GUI web pages;
    displaying, within the GUI web-browser page window, a GUI document in a GUI document display format as a first GUI web page wherein the GUI document comprises one or more GUI elements that are displayed in the GUI web-browser page window as presentation elements, wherein each of the presentation elements comprises an instance of a GUI class object and metadata, and wherein the GUI document comprises a set of existing presentation elements previously populated within the GUI document;
    enabling editing of at least one presentation element via editing tools, within the GUI web-browser, wherein enabling the editing of the at least one presentation element comprises providing, by the GUI web-browser, predefined properties, functions, and events for specification to the at least one presentation element, wherein the GUI web-browser enables:
        editing of the set of existing presentation elements, and
        adding a set of new presentation elements to the GUI document;
    saving, subsequent to receiving edits, the GUI document as a network accessible GUI document as the first GUI web page, wherein saving the GUI document as the first GUI web page comprises converting the GUI document from the GUI document display format to a GUI document stored format, the GUI document stored format comprising the instance of the GUI class object and the metadata as specified by, at least in part, the properties, the functions, and the events associated with the edited set of existing presentation elements and the set of new presentation elements;
    loading the GUI document stored format comprising the metadata associated with the at least one presentation element; and
    displaying the GUI document within the GUI web-browser, wherein displaying the GUI document within the GUI browser comprises reading the metadata to reconstruct the at least one presentation element on the page window as specified, at least in part, by the properties, the functions, and the events associated with the edited set of existing presentation elements and the set of new presentation elements.

2. The method of claim 1, wherein providing the GUI web-browser comprising providing an alternative to existing hypertext markup language (HTML) web browsers.

3. The method of claim 2, wherein displaying, within the GUI web-browser, the GUI document in the GUI document display format as the first GUI web page comprises displaying the first GUI web page that is an alternative to an HTML web page.

4. The method of claim 3, wherein displaying the GUI elements comprises displaying the GUI elements as alternatives to HTML elements.

5. The method of claim 1, wherein displaying the GUI document comprises:
    retrieving the GUI document in the GUI document stored format for display in the GUI document display format, wherein retrieving the GUI document comprises:
        obtaining a location of the GUI document stored format,
        requesting the GUI document from the location,
        reading the GUI document stored format to assign properties to the page window, and
        placing the one or more GUI elements in the page window based on the reading of the GUI document stored format.

6. The method of claim 5, wherein retrieving the GUI document in the GUI document stored format for display comprises:
    providing a user with an interface for receiving a GUI document address;
    receiving a selection of the GUI document address;
    retrieving stored data to convert into a GUI document display format within the page window from the GUI document address;
    converting the stored into the GUI document display format within the page window; and
    displaying the GUI document within the page window.

7. The method of claim 1, wherein saving the GUI document comprises at least one of the following:
    saving the currently displayed GUI document to a GUI document address, and
    overwriting an existing GUI document to the GUI document address.

8. The method of claim 1, wherein saving the GUI document to the GUI document stored format comprises at least one of the following:
    saving the GUI document as a single file in an accessible filing system, the single file comprising the GUI elements associated with the page, and saving the GUI document along with at least one other GUI document as a database file in the accessible filing system, the database file comprising unique identifiers assigned to each GUI document and its corresponding page window and GUI elements.

9. The method of claim 8, wherein saving the GUI document in the accessible filing system comprises saving the GUI document to at least one of the following:
- a location on a memory storage configured with read-write access by a current user embedded in a computing device comprising a GUI data management system (DMS),
- a location on the memory storage configured with read-write access by the current user, and embedded in the computing device on a local area network to which the GUI DMS computing device is connected, and
- a location on the memory storage configured with read-write access by the current user embedded in a server configured in a wide area network to which the GUI DMS computing device is connected.

10. The method of claim 1, wherein saving the GUI Document comprises:
- grouping the page window with its associated properties,
- grouping the at least one presentation element with its associated properties,
- assigning a common unique value to the page window group and to each corresponding presentation elements group associated with the page window group, and
- saving the grouped data in a file containing multiple displayed pages in stored format.

11. The method of claim 1, wherein the GUI web-browser enables a managing of GUI links, wherein managing GUI links comprises:
- creating at least one link,
- editing the at least one link,
- deleting the at least one link,
- associating one of the following: the GUI document and a World Wide Web page address with the at least one link,
- invoking the at least one link to retrieve and display an associated reference.

12. The method of claim 11, wherein creating the at least one link and editing the at least one link comprises associating the at least one link with one of the following:
- the at least one presentation element,
- a visually distinct area within the at least one presentation element, and
- a visually distinct portion of at least one property of the at least one presentation element.

13. The method of claim 1, further comprising:
- receiving a selection of the at least one presentation element;
- enabling a user to modify the at least one property associated with the selected at least one presentation element;
- receiving an indication of modification to the at least one property; and
- modifying the at least one property based on the received modification indication.

14. The method of claim 1, further comprises adding at least one additional presentation element within the GUI document, the at least one additional presentation element being a part of the set of new presentation elements.

15. The method of claim 14, wherein adding the at least one additional presentation element within the GUI document comprises:
- receiving a selection of the at least one presentation element from a plurality of presentation elements, and
- setting at least one property associated with the presentation element to a default value.

16. The method of claim 15, wherein saving the GUI Document comprises:
- grouping the at least one additional presentation element with its associated properties, and
- storing the two groups in a single file in an accessible filing system.

* * * * *